US011463560B2

(12) United States Patent
Turner et al.

(10) Patent No.: US 11,463,560 B2
(45) Date of Patent: Oct. 4, 2022

(54) NETWORK INTERFACE ARCHITECTURE HAVING A DIRECTLY MODIFIABLE PRE-STAGE PACKET TRANSMISSION BUFFER

(71) Applicant: Jump Algorithms, LLC, Chicago, IL (US)

(72) Inventors: Edward James Turner, Bristol (GB); Steven William Perry, Bristol (GB)

(73) Assignee: Jump Algorithms, LLC, Chicago, IL (US)

( * ) Notice: Subject to any disclaimer, the term of this patent is extended or adjusted under 35 U.S.C. 154(b) by 67 days.

(21) Appl. No.: 17/153,293

(22) Filed: Jan. 20, 2021

(65) Prior Publication Data

US 2022/0232108 A1  Jul. 21, 2022

(51) Int. Cl.
*H04L 69/08* (2022.01)
*H04L 49/20* (2022.01)
*H04L 49/9057* (2022.01)
*H04L 47/30* (2022.01)

(52) U.S. Cl.
CPC ........... *H04L 69/08* (2013.01); *H04L 47/30* (2013.01); *H04L 49/205* (2013.01); *H04L 49/9057* (2013.01)

(58) Field of Classification Search
None
See application file for complete search history.

(56) References Cited

U.S. PATENT DOCUMENTS

| | | |
|---|---|---|
| 7,895,431 B2 | 2/2011 | Lee |
| 8,706,606 B2 | 4/2014 | Chapman |
| 8,913,617 B1 | 12/2014 | Kopelman |
| 9,413,783 B1 | 8/2016 | Keogh |
| 9,961,022 B1 | 5/2018 | Kahn |
| 10,009,135 B2 | 6/2018 | Tait |
| 10,121,196 B2 | 11/2018 | Parsons |
| 2001/0037397 A1* | 11/2001 | Boucher ............... H04L 69/161 709/230 |
| 2006/0187947 A1 | 8/2006 | Ng |

(Continued)

FOREIGN PATENT DOCUMENTS

| | | |
|---|---|---|
| KR | 100226430 B1 | 10/1999 |
| WO | 2016081000 A1 | 5/2016 |

(Continued)

OTHER PUBLICATIONS

"Medium Access Control", Wikipedia, May 31, 2020, 4 pages.

(Continued)

*Primary Examiner* — Kouroush Mohebbi
(74) *Attorney, Agent, or Firm* — Lempia Summerfield Katz LLC

(57) ABSTRACT

An improved network architecture for minimizing latency of preparing and sending data to a network over a physical medium. A system for communicating messages over a network may create and store ready-to-send data packets in a data buffer next to or as close as possible, either physically and/or logically, to a MAC component. The MAC component may then receive the data packet directly from the data buffer and encapsulate the data packet into a frame suitable for transmission to the network. The data packet is modifiable while being stored in the data buffer prior to transmission to the network.

20 Claims, 6 Drawing Sheets

(56) References Cited

U.S. PATENT DOCUMENTS

| | | | |
|---|---|---|---|
| 2009/0016350 A1 | 1/2009 | Matsuo | |
| 2009/0092136 A1 | 4/2009 | Nazareth | |
| 2009/0168799 A1* | 7/2009 | Crowley | H04L 12/66 370/463 |
| 2014/0012972 A1 | 1/2014 | Han | |
| 2014/0064297 A1 | 3/2014 | Hirota | |
| 2015/0319271 A1 | 11/2015 | Wu | |
| 2017/0142000 A1 | 5/2017 | Cai | |
| 2018/0219805 A1 | 8/2018 | Macneil | |
| 2018/0276271 A1 | 9/2018 | Parsons | |

FOREIGN PATENT DOCUMENTS

| | | |
|---|---|---|
| WO | 2018001222 A1 | 1/2018 |
| WO | 2018090644 A1 | 5/2018 |
| WO | 2018157932 A1 | 9/2018 |

OTHER PUBLICATIONS

"Phy", Wikipedia, May 25, 2020, 2 pages.
"Physical Coding Sublayer", Wikipedia, Jan. 9, 2020, 4 pages.
Benjamin Geib, "Investigating Low Latency Trading with an HT Enabled FPGA", Universitat Heidelberg, Aug. 2, 2011, 17 pages.
C. Leber et al., "High Frequency Trading Acceleration Using FPGAs", International Conference on Field Programmable Logic and Applications, 2011, 317-322.
Garrett Yamasaki, "Three things you should know about Ethernet PHY", Jul. 15, 2015, https://e2e.ti.com/blogs_/b/analogwire/archive/2015/07/15/three-things-you-should-know-about-ethernet-phy, 2 pages.
Leber et al., "How to Get World's Best Possible Ultra Low Latency in High Frequency Trading (Tick to Trade Method)", 2012.
Lockwood et al., "A Low Latency Library in FPGA Hardward for High Frequency Trading (HFT)", Algorithms in Logic, Aug. 22, 2012, 22 pages.
Lockwood et al., "A Low-Latency Library in FPGA Hardware for High-Frequency Trading (HFT)", 2012 IEEE 20th Annual Symposium on High-Performance Interconnects, 2012, 8 pages.
Mostowfi et al., "Saving Energy in LAN Switches: New Methods of Packet Coalescing for Energy Efficient Ethernet", 2011 International Green Computing Conference and Workshops, Jul. 25, 2011, 8 pages.
Shaw et al., "Anton 2: Raising the bar for performance and programmability in a special-purpose molecular dynamics supercomputer", SC14: International Conference for High Performance Computing, Networking, Storage and Analysis, 2014, 13 pages.
Technical Note, TN_157, Ethernet Explained, FTDI Chip, Mar. 23, 2015, 17 pages, Verion 1.0.

* cited by examiner

NETWORK INTERFACE ARCHITECTURE HAVING A DIRECTLY MODIFIABLE PRE-STAGE PACKET TRANSMISSION BUFFER

BACKGROUND

Computer networking is an integral part of everyday life and relied on by individuals and businesses alike to communicate, share, and store data. A network is any collection of independent computers that exchange information with each other over a dedicated and/or shared communication medium. Local Area Networks (LANs) are usually confined to a limited geographic area, such as a single office or building or a small community. LANs can be small, such as linking as few as three computers, but can often link hundreds of computers used by thousands of people. The development of standard networking protocols and media has resulted in worldwide proliferation of LANs throughout business and educational organizations. Wide Area Networks (WANs), on the other hand, combine multiple LANs that may be geographically separate and linked together, such as via fiber optic cables, cable lines or satellite links.

Transaction processing systems may rely upon messages which are exchanged or otherwise communicated, such as via a network, e.g. the Internet, between the transaction processing system and the users of that system, and/or between other systems, to facilitate/implement the functionality of the transaction processing system. This exchange of messages may utilize communication protocols which may be standardized and well publicized so as to ease use of the systems, to ensure compatibility with other systems and communications media, and/or to facilitate use, development of and/or interaction with third party components. Multiple types of messaging protocols may be used, in combination and/or for different purposes. These protocols may be further defined to provide for efficient use of the communication medium, support for varying types and/or sizes of messages, secure transmission and/or reliable delivery of the messages communicated therewith.

A message protocol, also referred to as a communication protocol, generally specifies a set of rules and descriptions that detail how data should be structured, e.g. logically and/or physically, to allow for, or otherwise govern, transmission over a communications medium, across a network and/or between or within devices. Communication protocols exist that allow for the transmission of many different types of information and typically define or otherwise specify how the data should be structured, how to detect errors in the transmission of the data, the rate, or range thereof, of transmission for the data, how the data is transmitted, as well as other aspects of the mechanics of communication or combinations thereof.

To facilitate communication between computer systems or networks, the communications protocols used thereby may be implemented according to the Open Systems Interconnection ("OSI") reference model. The OSI model conceptualizes a layered abstraction structure to handle the packaging and transmission of data between/across various network devices. The OSI model generally specifies seven different layers, each of which may also be referred to as an abstraction layer and the collection of layers may be referred to as a protocol stack, where each layer has a particular set of communication protocols which will work on that particular layer and allow for communication with the adjacent layers. It will be appreciated that the terms "layer" and "protocol stack" may also refer to the computer software programs/components which implement the various model layers. These layers include a physical layer, a data link layer, a network layer, a transport layer, a session layer, a presentation layer, and an application layer. It will be appreciated that the layered structure may be implementation dependent and that fewer or more layers may be defined, e.g. some layers may not be implemented, the functionality of multiple layers may be combined into a single layer or the functionality of a single layer may be further divided among additional/multiple layers.

According to the OSI model, the physical layer deals with the electrical, or optical, and physical requirements for devices engaged in data transmission. The data link layer is the protocol layer that transfers data between adjacent network nodes in a WAN or between nodes on the same LAN segment and provides the functional and procedural means to transfer data between network entities. The network layer provides the functional and procedural means of transferring fixed or variable length data sequences from one node to another connected to the same network. The transport layer provides the functional and procedural means of transferring variable-length data sequences from a source to a destination host via one or more networks. The session layer controls the dialogues between computers by establishing, managing, and terminating the connections, i.e. sessions, between local and remote applications. The presentation layer establishes context between application-layer entities, in which the application-layer entities may use different syntax and semantics if the presentation service provides a mapping between them. The application layer is the OSI layer closest to the end user and interacts with software applications on a user computer, which means both the OSI application layer and the user may interact directly with a software application. Among other attributes, the OSI model, and accompanying protocols compliant therewith, facilitates both unreliable and reliable communication, i.e. protocols which may or may not include mechanisms that detect and notify a user or other component if the delivery of data fails.

A lower layer down from the transport and network layers is the data link layer which, as described above, defines the protocol to establish and terminate a connection/session between two physically connected devices. Ethernet is an example of a data link layer protocol that can work in conjunction with the protocols which implement the other OSI layers, such as Transmission Control Protocol (TCP)/Internet Protocol (IP) protocols used for the transport and network layers. Ethernet describes how networked devices can format data for transmission to other network devices on the same network. Ethernet converts and organizes the bits and bytes of a data transmission into proper form in order to be transmitted out of a computer via an Ethernet port. The proper form may be a logical form such as packets, referred to as Ethernet Frames, or a physical form such as electrical pulses with certain frequencies. The packets identify the Ethernet source of data and Ethernet destination for the data, and include a data payload carrying, depending upon the amount, all or a subset of the data to be transmitted. An Ethernet Frame includes a source and destination address, where the source and destination addresses correspond to Media Access Control addresses (or MAC addresses) for nodes on the network. The data payload is where any other headers for other protocols may be located as well as any data that may ultimately be used by applications. A TCP packet may be transmitted over an Ethernet compatible network using one or more Ethernet frames.

A network interface controller (NIC) is a computer hardware component, such as an integrated circuit board, that allows a computer to communicate over a computer network, such as a LAN or WAN, and may also be referred to as a network interface card or port, network adapter, Ethernet card or port, or LAN adapter. A traditional NIC implements the data link and physical layers. Newer "Smart NICs" and other devices integrating computer and processing capabilities with a NIC, such as an FPGA, may also implement the transport and network layers. The NIC may be in the form of an add-on component that fits in an expansion slot on a computer's motherboard or the computer may have the NIC built-in, meaning the NIC is part of the computer's circuit board. In either case, the NIC is the hardware interface between a network and a computer. The NIC is responsible for preparing the data, such as a TCP packet, to be sent over the network medium. This preparation may depend on the medium being used. Most networks today use Ethernet. The NIC may consist of a number of components, such as a controller, multiple types of memory, such as a boot ROM socket, one or several ports, a motherboard connection interface (bus interface or Peripheral Component Interconnect (PCI)), and some other electronic components, each with their own unique function. The controller processes data received on the NIC, much like a small CPU. A boot ROM socket allows diskless workstations to connect to a network. One type of port typically found on a NIC is an Ethernet port, which allows the computer to connect with an Ethernet cable or transceiver directly. Data in the form of electric signals are generated and received by this port to allow the flow of data between the network and computer. The bus interface or PCI is what connects the NIC to the computer or server it is attached to.

The application layer of the OSI Model is the layer of the OSI model closest to an end user and is where applications and end user processes are implemented that deal with the data transmitted from the bottom layers to the top layers. Some example protocols that handle data on the application layer are HTTP, SMTP, etc. World Wide Web browser programs are an example of an application layer program. In the context of electronic financial markets, the Financial Information Exchange ("FIX") protocol is an application layer protocol (as well as a session and presentation layer protocol) which may be used with financial systems and financial trading software applications. The FIX protocol comprises a specification for standardized and streamlined real-time exchange of information related to securities transactions and markets.

Financial instrument trading systems are one example of electronic transaction processing systems that utilize message handling protocols such as TCP/IP and Ethernet, e.g. to receive transaction requests, e.g. orders to buy or sell, from participants and communicate the results of those requests, e.g., market data, thereto. Face-to-face human trading was the standard way of doing business for a long time. Rules and procedures varied from exchange to exchange, but they all had one or more physical trading floors (sometimes called a "pit"), whereby the traders, or their representatives, all physically stand in a designated location and communicate verbally and/or via hand signals to convey trading information, along with their intentions and acceptance of trades. This was known as the open outcry system. Nowadays, most trading at financial exchanges occurs via an electronic trading platform. Current financial instrument trading systems allow traders to submit orders and receive confirmations, market data, and other information electronically via a communications network. These "electronic" marketplaces are also referred to as "electronic trading systems."

Electronic trading of equities or derivatives, such as options contracts and futures contracts, and other financial instruments/products, is conducted by sending orders in electronic form over a network to an electronic stock exchange. For example, a trading software system, executing on a trader's computer, may be used by the trader to create, automatically and/or manually, these electronic trade orders, which are then transmitted down through the OSI layers to the Ethernet port of their computer to be sent out over the network to the exchange. These orders, such as bid and ask orders, are then matched by the exchange, e.g., with orders received from other traders, to execute a trade. Outstanding orders, i.e., previously received but not yet canceled or fully satisfied, are stored in an order book database, referred to as "resting," and made visible to the market participants through so-called market data feeds. A feed is a compressed or uncompressed near real time, or otherwise, data stream provided by the exchange or an independent institution like the Options Price Reporting Authority (OPRA). A feed carries pricing information of the traded products and may be multicasted or otherwise broadcasted to the market participants over the network using standardized protocols. Not only do these automated electronic trading systems make the trading process simpler, they also help traders improve on the speed of their trades. Electronic trading systems also cut down on error and reduce costs.

Algorithmic trading, or automated trading, utilizes a computerized/automated method of analyzing/modeling data, such as market data or other information, and generating and executing trade orders, with or without human input, using automated pre-programmed trading instructions (algorithms and/or models) accounting for variables such as time, price, volume, or any mathematical model. Given the speed and data processing advantages that computers have over human traders, this type of trading may generate profits at a speed and frequency impossible for human traders to match.

Generally, trade orders are generated as a result of some type of information received by the trader (or their trading system), i.e., a motivation to generate a trade order. This information may include market data, as received via a feed as described above, news, weather data, a result of a calculation, computation or derivation, or other information such as the result of research, etc. Based on this information, the trader (or their trading system) then needs to actually generate one or more trade orders, e.g., decide what one or more products to buy/sell, whether to buy and/or sell, at what price and in what quantity. Finally, the trade order(s) needs to be sent out. As described above, the trend of trading systems is to speed up this process of generating and executing trades, from the moment information is received that initiates the generation of the trade order to the moment that trade order leaves the network port of the trader's computer or their network. This process of receiving market data, and subsequently, based thereon, generating and sending a trade order may be referred to as "tick to trade" and the time it takes send a trade order out after receipt of the market data on which that trade depends may be referred to as the "tick to trade latency." Trading today is a constant race to react to information, generate and send out orders as quickly as possible. However, as the speed of computers increase, so too does the speed of which information is received by the traders via market data feeds. This creates a cycle—faster trading results in more frequent market data updates via the data feeds, and more frequent market updates encourages faster trading. In many cases, new information, which may negate, augment or supplant previously received information, may be received during the tick to trade latency period, i.e., in the short amount of time between the generation of a trade order based on the prior, now outdated/obsolete, information and that trade order being sent out via the network port. In some cases, this newly received information may change a trader's intent with respect to their trade order that is about to be sent out.

The speed and efficiency of transmitting market data may depend on a number of metrics of electronic trading system performance, including latency. Latency of the electronic trading system may be measured as the response time of that system. This can be measured in a number of different contexts: the time elapsed from when an order, or order cancelation, is received by an exchange of the electronic trading system to when a confirmation/acknowledgment of receipt is transmitted thereby, from when an order is received to when an execution notification is transmitted, or the time elapsed from when an order is received to information about that order being disseminated in the market data feed. Generally, market participants desire timely and deterministic market data updates, low latency/high throughput order processing, and prompt confirmations of their instructions to allow them to: competitively, frequently and confidently evaluate, and react to, or, conversely avoid, discrete, finite, fast moving/changing or ephemeral market events; and/or otherwise coordinate, or synchronize their trading activities with other related business concerns or activities, with less uncertainty with respect to their order status.

On the trader side, there is a constant need for accelerated data processing, particularly for data received over networks. This need is especially present in the processing of market data and generating and sending financial instruments by traders, since the speed of receiving and delivering data, such as receiving market data and sending buy/sell orders, is a crucial factor in this industry. The technical problem of reducing latency, such as "tick to trade latency," is just as important, since mere fractions of a second can mean the difference between gaining or losing money. In addition to financial instrument trading systems, the need for accelerated data processing is also present for a wide variety of other applications. While advances in parallel algorithms and special-purpose hardware in recent years have improved the processing capabilities, there remains a challenge to fundamentally change the system architecture in which these types of platforms are deployed in order to reduce latency and increase speed.

DETAILED DESCRIPTION

Figure 1:
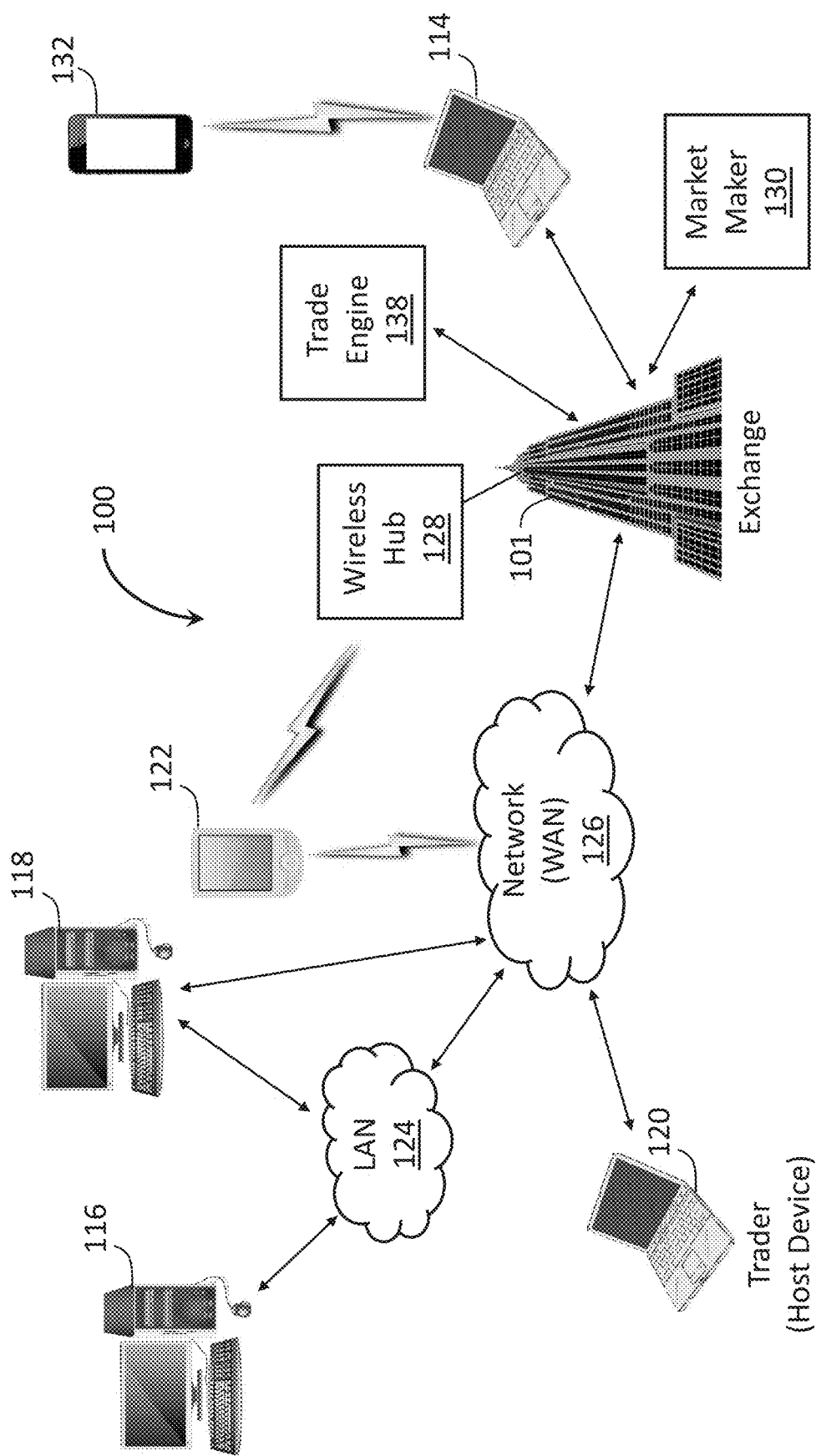
FIG. 1 depicts an illustrative electronic trading system that may be used to implement aspects of the disclosed embodiments.

The disclosed embodiments relate to implementation of a communications network interface, such as an Ethernet card or port, network interface card (NIC), or network adapter, all of which may also be referred to as network interface architecture, having improved performance and which further minimizes the latency of preparing and sending data to a physical medium of an electronic communications network while maximizing a window of opportunity over which the data to be transmitted may be modified prior to transmission.

More particularly, the disclosed embodiments relate to an improved network interface architecture for communicating messages over an electronic communications network. In one embodiment, the electronic communications network may use the Ethernet protocol to transmit messages used by an electronic trading network or system, such as orders to trade sent to an Exchange of the electronic trading system and market data messages sent from various sources of the electronic trading system to a trader computing device, workstation, terminal, etc. Electronic trading systems, as will be described, are implemented using computer technology, e.g. processors, memories, electronic communications networks, and the like. Underpinning the provisioning of the disclosed features is a need to improve the processing performance of the computer technology used in a user's (i.e., trader's) computing device, including computer hardware and software, that communicates with electronic trading platforms via the network, including the network interface architecture thereof. In one example, the improved processing performance allows for a reduction in the tick to trade latency, i.e., speed up the process of generating and transmitting trades, from the moment information is received, e.g. that might initiate the generation of a responsive trade order, to the moment that responsive trade order leaves the network port, such as an Ethernet port, of the trader's computing device en route to an Exchange of the electronic trading system. The disclosed features also improve other non-trade uses as well, such as market data publishing, maintaining sessions with the exchange, or to simplify memory management. Multiple trading strategies (where the term "strategy" may refer to either or both the analysis performed to analyze market data and generate trade orders based thereon, or the generated trade orders themselves) may be implemented and/or managed by multiple processors, which may or may not be integrated in the same device or substrate, sharing the same Ethernet port, and each of these processors may need to be able to send their own data packets. These processors need to be able to construct and send data packets with as low a latency as possible and in a reliable and authorized manner. Given that information received by traders via market data feeds may affect trading strategies and result in traders wishing to change previously generated trade orders, there is also a need to maximize the window of time, which may be referred to as the "tick to modify opportunity or window," that traders have to alter or modify their previously generated, but not yet transmitted, trade orders in response to the information received via the data feeds.

To improve performance and volume, merely implementing existing systems using newer and faster general-purpose technology may be insufficient. General-purpose processors, operating systems and compilers implement general optimizations and operations designed to improve performance and reliability while maintaining broad applicability across a wide variety of applications. As such, these optimizations are not necessarily optimized for any one application, e.g. such as for communicating trades to an Exchange of an electronic trading system. These optimizations, which are largely defined by the manufacturer and may be out of the control of an application developer, may, in fact, undermine the application for which the general-purpose processor is being used. In particular, with respect to the transactions processed by an Exchange of an electronic trading system and market participants, such as traders, where timing of trade orders is paramount, underlying optimizations may be disruptive.

General purpose processors and operating systems further suffer from their general availability and applicability which has made them susceptible to being reverse engineered and compromised by unknown or uncorrected deficiencies or defects, particularly security related, making them vulnerable to hacking, viruses and other threats. Accordingly, firewalls or other security appliances, applications or protocols may be required to ensure the safety and security of such systems, which further adds latency, degrades throughput or otherwise impedes performance.

As discussed above, the Open Systems Interconnection ("OSI") reference model, which conceptualizes a layered abstraction structure to handle the packaging and transmission of data between/across various network devices, includes seven different layers, including: a Physical layer, a Data Link layer, a Network layer, a Transport layer, a Session layer, a Presentation layer, and an Application layer.

In conventionally implemented systems, each of the OSI layers may be implemented by a different software component, each of which introduces its own latency in both conveying data received from the network to the application layer and conveying trade orders generated by the application layer back to the network.

Ethernet is an example of a Data Link layer protocol that can work in conjunction with the protocols which implement the other OSI layers, such as Transmission Control Protocol (TCP)/Internet Protocol (IP) protocols used for the Transport and Network layers. Ethernet describes how networked devices can format data for transmission to other network devices on the same network. Ethernet converts and organizes the bits and bytes of a data transmission into proper form in order to be transmitted out of a computer via a network port of a network interface, such as an Ethernet port of an Ethernet card, or network adapter. An Ethernet network interface is both a Physical layer and Data Link layer device, as it provides physical access to a networking medium and provides a low-level addressing system through the use of Media Access Control ("MAC") addresses that are uniquely assigned to network interfaces. Ethernet interfaces typically include a MAC controller and physical electronic circuit, or PHY (an abbreviation for "physical layer"). The Ethernet MAC controller connects directly to the Ethernet PHY and is responsible for managing data packets that are to be sent and received over a network. The Ethernet MAC controller is driven by system software and handles addressing and data packetizing, as well as the identifying and encapsulating network layer protocols, and controls error checking and frame synchronization. The functions of the Ethernet MAC controller correspond to the Data Link layer of the OSI model. The Ethernet PHY is responsible for the physical link between the Ethernet MAC controller and the network. An Ethernet network interface, which may take the form of an Ethernet card or adapter or may be otherwise integrated with other components of a system, also includes an Ethernet port, jack, socket, or connector, such as a female RJ45 connector, a Small Form-factor Pluggable (SFP) connector, or Small Form-factor Pluggable Plus (SFP+) connector, that is used to connect to a physical medium such as a copper Ethernet cable, optical fiber, or wireless medium. In this regard, the Ethernet PHY is responsible for the transmission and reception of unstructured raw data, such as raw bit streams, between a device and a physical transmission medium, such as copper or optical fiber, or over a radio link. The Ethernet PHY converts the digital bits into, for example, electrical, radio, or optical signals. Layer specifications define characteristics such as voltage levels, the timing of voltage changes, physical data rates, maximum transmission distances, modulation scheme, channel access method and physical connectors. This includes the layout of pins, voltages, line impedance, cable specifications, signal timing and frequency for wireless devices. The functions of the Ethernet PHY correspond to the Physical layer of the OSI model.

Historically, in current host devices of electronic trading systems comprised of an Ethernet network card/adapter or integrated component coupled with a PCI bus in a computer, the Physical and Data Link OSI layers would be implemented in the hardware of the network card/adapter itself and the higher OSI layers (Network, Transport, Session, Presentation, Application) would be software routines executed in the host CPU on the other side of the PCI bus. More recent implementations of network cards, such as Smart NICs, have moved the more compute intensive features of the higher layers (Network and Transport in particular) on to the network card/adapter, using a processor or FPGA based device integrated on the card/adapter, in order to reduce latency. This may reduce the loading on the main CPU for functions such as IP checksum generation and TCP session management, but overall latency, however, is still an ever-present technical problem to be improved upon. Even when additional OSI layers, such as the Network and Transport layers, are implemented on the network card/adapter as opposed to the host device, data created at the Application layer, such as trade orders using a financial application software system, still needs to be passed or flow through the various layers between the Application layer and the Data Link layer, where each respective layer that the data passes through performs certain functions (i.e., the functions associated with the respective OSI layer the data flows through).

Further, once the financial application software system in the Application layer hands off the trade order data to the next layer in the data path, a user of the financial application software system (i.e., the trader) is typically no longer able to make modifications to the trade order as the data passes through the subsequent layers in the data path prior to transmission to the network. This means that if a trader receives information immediately after sending a trade order that causes the trader to want to change or modify the trade order that was just submitted, the trader is unable to do so.

In contrast, while conventional systems give up control as soon as the data leaves the Application layer and experiences latency as the data moves through the OSI layers, the proposed embodiments bypass a number of the OSI layers to improve latency and retain user control up until the data is transmitted to the Data Link layer. The proposed architecture improves the manner in which a computer operates to process data, resulting in a functional improvement to network communication technology. The proposed embodiments provide a specific manner of generating, processing and transmitting data, which provides a specific technical improvement over prior systems resulting in improved computer functionality for communicating messages over an electronic communications network, such as an electronic trading system.

In particular, in one embodiment, an architecture for a network interface, such as an Ethernet port, is disclosed. As will be described in more detail below with respect to FIGS. 2-4, the network interface architecture implements prestaged data packets which are stored in a memory, or data buffer, the data packets being created by one or more processors so as to be in a state in which the data packets are ready for transmission to the MAC component of the network interface (i.e., the data is in a state as if the data had already passed through, and undergone the functions of, the Application, Presentation, Session, Transport, and Network layers of the OSI model). In other words, in one example where a data packet is not changed at all between the time it is prestaged and the time it is forwarded to the MAC component, being in a state of ready for transmission may mean that the data packet is constructed so that all of the fields in the data packet are valid and correct and could be sent at any moment with no further modifications or adjustments required. In another example, as discussed below, when certain data fields within the data packet (e.g., critical order fields such as symbol, quantity, or a sequence number required by the exchange) may be altered after the data packet is prestaged but prior to transmission to the MAC component, to be in a state of being ready for transmission may mean that all of the data fields in the data packet are valid and correct except for the critical order fields, which may be changed, updated or accepted as is immediately prior to being sent. These ready-to-send data packets may be constructed and stored in the memory all at once or may be constructed piece by piece over time in the memory. The ready-to-send data packets may be stored in a prestaged packet memory that is physically and/or logically located next to or as close as possible to the MAC component so as to reduce or minimize latency in transferring data packets from the prestaged packet memory to the MAC. The partial or completed ready-to-send data packets stored in this memory are also subsequently modifiable by the one or more processors, such that a trader may modify a trade order stored in the prestaged packet memory for a period of time up until the trade order is sent directly from the prestaged packet memory to the network interface MAC component, i.e., the disclosed embodiments maximize the window of opportunity for a trade order to be modified prior to transmission.

In this regard, using the network interface architecture described above, data packets ready for transmission are generated ahead of time and conceptually moved down the OSI layer model from the Application layer to the Network layer and are ready for submission to the Data Link layer and stored in this state as logically and/or physically (geographically) close as possible to the MAC/PCS logic. In one embodiment, the storage of these ready-to-transmit packets may be implemented/integrated adjacent to the MAC on the die/substrate itself so as to minimize the distance to the MAC, and thereby minimize latency. It will be appreciated that there may be other ways to minimize latency between the packet storage and the MAC, including improved interconnections, direct integration of the packet storage with MAC, etc. which may be used alone or in combination with the physical location of the packet storage relative to the MAC, and all such latency reducing mechanisms, now available or later developed, are contemplated herein.

A technical advantage achieved by storing ready-to-submit data packets next to the MAC component of the network interface is that it lowers latency by reducing the amount of time needed to place data packets into the correct format and to transmit those data packets to the MAC component, thereby reducing the total time needed to transmit data packets to the network. Another advantage is that a user does not need to send a multi-bit data packet to the MAC component and can just "trigger" a data packet to be sent, i.e., the data for transmission, which may take more time to transfer, can be stored in advance and only a smaller amount of data, e.g., the trigger, which may take less time to transfer, need be sent at the time transmission is desired. Further, only bits that need to be changed or modified need to be sent prior to transmission, which is smaller than the data packet itself. In this case, the host does not need to serialize down the entire data packet in order to send to the MAC component. Reducing the amount of data needed to be sent may reduce the time needed to send that data. This provides a specific technical improvement over prior systems, resulting in an improved system for communicating messages over an electronic communications network.

While the disclosed embodiments will be discussed with respect to creating data packets within an electronic trading system, e.g. a trading system in which certain data (e.g., market data) is received by a financial application software system of a user's (i.e., trader's) computing device and processed and analyzed by the computing device in order to generate and transmit other data (e.g., responsive data such as trade orders to buy, sell, modify, or cancel) to a network (i.e., exchange), it will be appreciated that the disclosed embodiments are applicable to creating data packets and communicating the data packets over any electronic communications network for any purpose. While the disclosed embodiments may specifically address Ethernet protocols, and component devices implemented in support thereof, for communicating messages over a network, it will be appreciated that other protocols may be implemented. Further, it will be appreciated that "Ethernet port" may refer to any type of network interface, such as a network adapter, whether a separate or integrated component, and "physical interface" may refer to any type of physical connection, such as an antenna, network port, jack, socket, or connector.

An exemplary trading network environment including the disclosed electronic communications network 100 is shown in FIG. 1. In one embodiment, the electronic communications network 100 may be an electronic trading system 100 and may use the Ethernet protocol to send and receive messages. The network may be a collection of public and/or private wired and/or wireless networks. In one embodiment, at least a portion of the network comprises the Internet. In the exemplary environment, the exchange 101 of the electronic trading system 100 receives messages (i.e., financial messages), such as trade orders, and transmits market data, e.g. related to orders and trades, to users, such as via wide area network 126 and/or local area network 124 and computer devices 114, 116, 118, 120, 122 and 132, as will be described below, coupled with the electronic trading system 100.

Herein, the phrase "coupled with" is defined to mean directly connected to or indirectly connected through one or more intermediate components. Such intermediate components may include both hardware and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

As used herein, a financial message or financial data message may refer both to messages communicated by market participants to an electronic trading system, such as the electronic trading system 100 of FIG. 1, and vice versa. Financial messages communicated to the electronic trading system 100, such as to an exchange 101 of the electronic trading system 100, also referred to as "outbound" messages, may include request messages, such as trader orders, order modifications, order cancellations and other transaction requests, as well as other message types. Financial messages communicated from the electronic trading system 100, referred to as "inbound" messages, may include messages responsive to outbound messages, such as confirmation and other response messages, or other messages such as market update messages, quote messages, and the like, e.g. market data messages.

An order to trade, or trade order, is effectively an order or request for a transaction with respect to a financial instrument, such as an equity, e.g. a stock, or a derivative, e.g., a futures contract, options on future, spread or other combination contract, etc., wherein the transaction further specifies at least whether the trader desires to buy (bid) or sell (offer or ask) the financial instrument, the desired price therefore, and quantity thereof. It will be further appreciated that other factors, such as conditions, e.g. stop orders, etc., may also be specified. Further, the price may be specified as a fixed value, relative value, upper or lower limit value, or range of values. The financial instrument may comprise one or more component instruments or component transactions. A trade order may be for a single component instrument or a combination contract, which includes more than one component instrument or component transaction. Hereinafter, orders for a single component instruments or component transactions and combination contracts may be referred to as a trading strategy, or simply strategy. As used herein, the term "strategy" may be used to describe the analysis performed to analyze market data and generate one or more trade orders based thereon, or to those generated orders themselves. For example, a strategy may be a predetermined "if/then" condition, such as "if X is [greater than/less than] Y, then [buy/sell]," and market data may be the input that determines whether the specific conditions are satisfied. Strategies of combination instruments may be defined by the exchange 101 and advertised to traders as tradable instruments, e.g., tradable via a single transaction, and/or they may be created by a market participant using a combination of multiple transactions.

The various users (i.e., participants) of an electronic trading system 100 may be physically implemented with one or more mainframe, desktop or other computers, reconfigurable logic components, network switches, gateways, routers and other communications devices operative to facilitate communications within the electronic trading system 100 and between the electronic trading system 100 and the market participants. Logically, the participants of the electronic trading system 100 implement numerous functions/functional modules each of which, as will be described, may be implemented in software, hardware or a combination thereof, as single standalone component or combination of interconnected components or in combination with another function/functional module.

The trading network environment shown in FIG. 1 includes exemplary computer devices 114, 116, 118, 120, 122 and 132 which depict different exemplary methods or media by which a computer device may be coupled with, either directly or indirectly, the electronic trading system 100 or by which a user may communicate, e.g. send and receive, trade or other information therewith. It will be appreciated that the types of computer devices deployed by market participants and the methods and media by which they communicate with the electronic trading system 100 is implementation dependent and may vary. Not all of the depicted computer devices and/or means/media of communication may be used and other computer devices and/or means/media of communications, now available or later developed, may also be used. Each computer device, such as the host device 120 of a trader described in more detail below with respect to FIGS. 2-4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the electronic trading system 100. Depending on the type of computer device, a user can interact with the computer with a keyboard, pointing device, microphone, pen device or other input device now available or later developed.

An exemplary computer device 114 is shown directly connected to the exchange 101, such as via a T1 line, a common local area network (LAN) or other wired and/or wireless medium for connecting computer devices. The exemplary computer device 114 is further shown connected to a radio 132. The user of radio 132, which may include a cellular telephone, smart phone, or other wireless proprietary and/or non-proprietary device, may be a trader or exchange employee. The user of the radio 132 may transmit orders or other information to the exemplary computer device 114 or a user thereof. The user of the exemplary computer device 114, or the exemplary computer device 114 alone and/or autonomously, may then transmit the trade or other information to the exchange 101 of the electronic trading system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computers and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with the exchange 101 via a conventional wireless hub 128.

FIG. 1 also shows the LAN 124 coupled with a wide area network ("WAN") 126, such as via a network gateway or router (not shown), which may be comprised of one or more public or private wired or wireless networks. In one embodiment, the WAN 126 includes the Internet 126. The LAN 124 may include a router to connect the LAN 124 to the Internet 126. Exemplary computer device 120 is shown coupled directly to the Internet 126, such as via a modem, DSL or Ethernet line, satellite dish or any other device for connecting a computer device to the Internet 126 via a service provider therefore as is known.

The users, i.e. the market participants, of the electronic trading system 100 may include one or more market makers 130 which may maintain a market by providing constant bid and offer prices for a derivative or security to the electronic trading system 100, such as via one of the exemplary computer devices depicted. The electronic trading system 100 may also exchange information with other trade engines, such as trade engine 138. One having ordinary skill in the art will appreciate that numerous additional computers and systems may be coupled to electronic trading system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 or 120 may include computer-executable instructions for receiving order information from a user and transmitting that order information to the exchange 101 of the electronic trading system 100. In another example, the exemplary computer device 118 or 120 may include computer-executable instructions for receiving market data from the exchange 101 of the electronic trading system 100 and displaying that information to a user, such as a trader.

Of course, numerous additional servers, computers, handheld devices, personal digital assistants, telephones and other devices may also be connected to the electronic trading system 100. Moreover, one having ordinary skill in the art will appreciate that the topology shown in FIG. 1 is merely an example and that the components shown in FIG. 1 may include other components not shown and be connected by numerous alternative topologies.

Figure 2A:
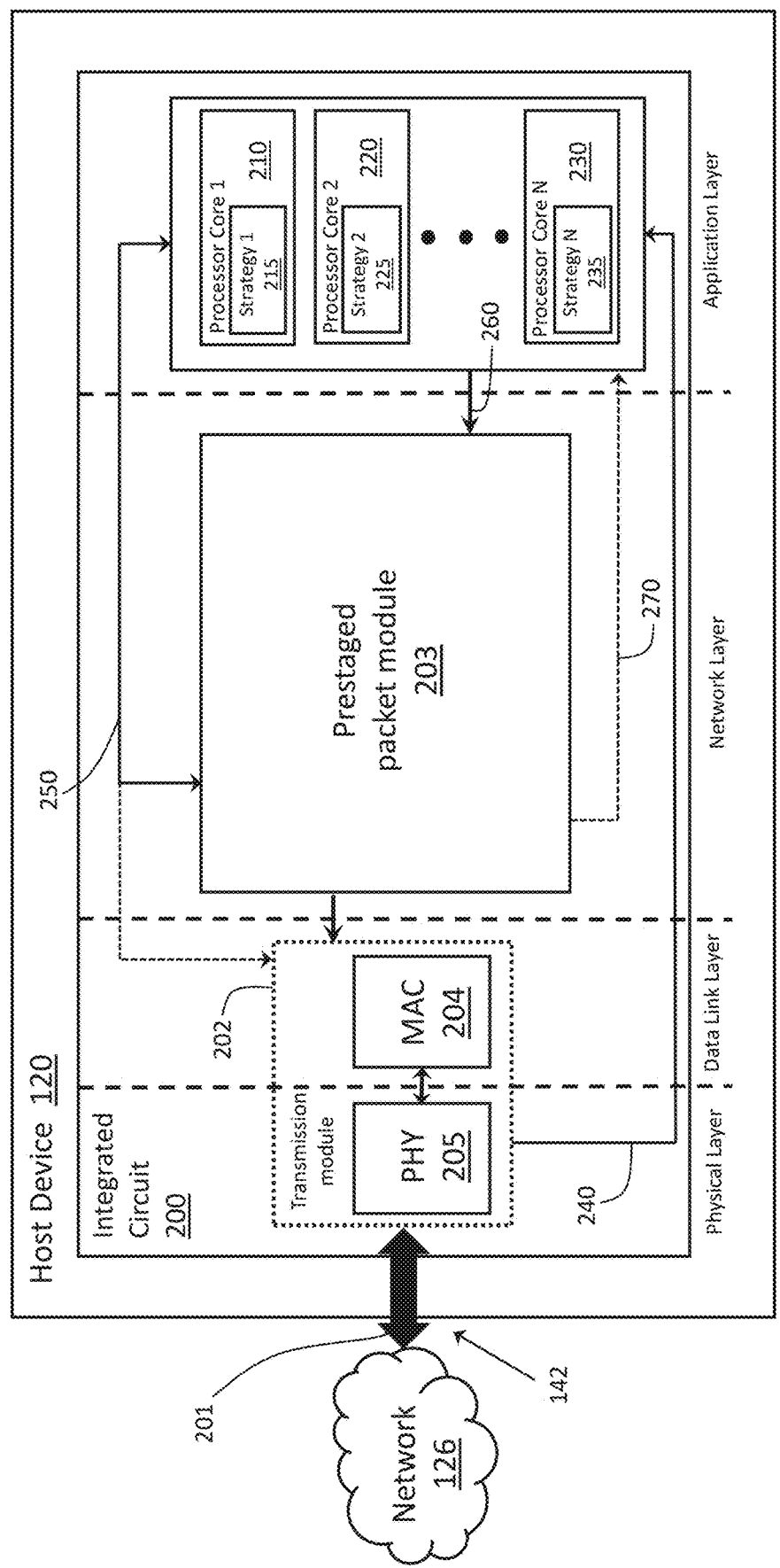
FIG. 2A depicts a block diagram of an exemplary device for communicating messages from the device to a network for use with the system of FIG. 1 according to one embodiment.

FIG. 2A shows a block diagram depicting, in more detail, the host device 120 of the electronic trading system 100 of FIG. 1, according to one embodiment. As shown in FIG. 2A, the host device 120 is connected to a network 126 and includes an interconnecting infrastructure, such as by being implemented on a physical substrate/chip or integrated circuit 200, that includes at least a physical interface 201 (i.e., transmit port, output port, or physical connection), a transmission module 202 (i.e., network adapter), a prestaged packet module 203, and one or more processors 210, 220, 230. The interconnecting infrastructure, or integrated circuit 200, of the host device 120 may also include, in addition to the specific components described above, other networking devices such as gateways, switches, and interconnecting media there between, such as backplane interconnects, optical and electrical communications media or other wired or wireless interconnects. The integrated circuit 200 generally couples the various components of the host device 120 together as will be described. While the interconnecting infrastructure will be referred to as an integrated circuit 200 hereinbelow, other implementations of the interconnecting infrastructure are possible. For example, the interconnecting infrastructure may include discrete components connected via wires, circuit board traces, connectors, and the like, as opposed to being formed on the same substrate, such as an integrated circuit. In another example, the interconnecting infrastructure may be formed using a combination of integrated and discrete components, such as a field programmable gate array (FPGA). In yet another example, certain components of the interconnecting infrastructure may be discrete in certain implementations and integrated in other implementations.

It will be appreciated that identifying and defining the boundaries of an inter-networked communications system, the internal components thereof being interconnected as well, such as between the host device 120 and market participants and the infrastructure which allows communications there between, may be complex. Physically, the various network device, e.g. switches, gateways, routers, and the cabling and connections there between, may be owned, leased and/or controlled by different entities, as well as physically located in disparate geographic locations which may be geographically proximate to, or remote from, the entity which owns, leases or controls the network device. In some cases, a network device owned and operated by a service provider may be physically located within the premises of entity to which the services are provide or, alternatively, the network device owned and operated by the service recipient may be physically located within the premises of the service provider, both situations being referred to as colocation. Logically, the paths, and the boundaries there between, over which transactions flow and the boundaries between entities may be more difficult to discern.

Accordingly, as generally used herein, the host device 120, or the components or boundaries thereof, may be defined in numerous ways. The logical boundary or boundaries of the host device 120, which may also be referred to as the demarcation point or edge 142, may be defined as the first, or last, point at which the host device 120 can control or otherwise manipulate an incoming, or outgoing, transmission, e.g. data message or packet. For example, for an outgoing data packet, the edge 142 of the host device 120 may be defined as the last point at which the host device 120, or component thereof, can recall or otherwise stop the transmission. For example, the demarcation point or edge 142 may be the point at which a trade order message is provided to the transmission module 202 for transmission or other points where data packets are individually forwarded toward their respective destinations, e.g. individually distinguishable by destination address. In at least one disclosed embodiment, the edge or demarcation point 142 may further be defined as the point at which data messages or packets destined for one or more market participants are transmitted simultaneously, or substantially simultaneously, i.e. transmitted within a short time period such that an observer would consider them simultaneously transmitted or otherwise find the difference there between practically, logically or physically imperceptible. Thereafter, variation in network path latencies, etc. may impart unequal delays on the delivery of those messages.

Generally, the edge 142 will lie between a component of the host device 120, such as a router or gateway device (not shown), and a component, such as router or gateway device (not shown), controlled by another entity, such as an Internet Service Provider or other operator of the LAN 124 or WAN 126 shown in FIG. 1. As described above, the edge or demarcation point 142 may be geographically located anywhere, e.g. it may be geographically proximate to or remote from the other components of the host device 120. In some embodiments, market participants may co-locate devices for receiving data from the host device 120 in the same geographic location as the components of the host device 120 which transmit that data.

The integrated circuit 200 of the host device 120 includes one or more processors 210, 220, 230, each processor having one or more cores. In the example shown in FIG. 2A, there are "N" number of processor/core combinations 210, 220, 230, where "N" is a positive integer and where each processor has a single core, hereinafter referred to as a processor core, processor/core, or simply a processor. While a single processor/core combination will be described herein, it will be appreciated that any number of processor/core combinations may be implemented both to improve fault tolerance through redundant operation and to increase the transaction handling capacity of the host device 120. In one embodiment, the integrated circuit 200 of the host device 120 may include an array of processors and each processor of the array may have one or more cores (i.e., an array of multi-core processors).

As shown in FIG. 2A, the processors 210, 220, 230 are implemented in the Application layer of the OSI model and are configured to interact with software applications, such as a financial application software, on the host device 120. As mentioned above, the Application layer is the OSI layer closest to the end user. As such, a user, such as a trader, uses the financial application software on the host device 120 to cause the processors 210, 220, 230 to generate data, e.g., create trade orders or strategies. As shown in FIG. 2A, each processor 210, 220, 230 may be associated with, i.e. used to implement, a unique strategy 215, 225, 235. In another example, each processor 210, 220, 230 may be associated with a plurality of unique strategies. In yet another example, a unique strategy may be associated with more than one processor (i.e., more than one processor is used for a particular strategy). For instance, one processor may be used to generate a pre-formatted generic data packet that may be associated or used with one or more strategies and another processor may be used to generate and send a trigger (i.e., signal or command) to transmit the data packet, or a modification (i.e., altered data or an instruction to alter data in a prestaged data packet) and a trigger, when a particular event occurs (e.g., when an if/then condition of a strategy is satisfied). A user may receive an input 240 of data, such as market data, from the exchange 101, by way of the network 126, physical interface 201, transmission module 202, and processors 210, 220, 230 in communication with the financial application software. In one embodiment, the input 240 may be a single connection from the transmission module 202 to the array of processors 210, 220, 230. In another embodiment, the input 240 may include a plurality of inputs, where certain inputs are created for and sent to specific processors of the array of processors. For example, one or more inputs 240 may be sent to each processor separately and may include specific data tailored for each respective processor. The input 240 of market data may be used to create the respective strategies 215, 225, 235 of the respective processors 210, 220, 230. In other words, the input 240 of market data may provide a user with motivation to generate the trade orders represented by the respective strategies 215, 225, 235. In another example, the input 240 of market data determines whether a particular strategy is satisfied and initiated or triggered, i.e., whether the market data satisfies conditions of an if/then strategy, as discussed above. As will be described below, requests to send out trade orders may also be based on the input 240 of data received by the user from the network. While the input 240 of FIG. 2A shows a direct connection between the transmission module 202 and the processors 210, 220, 230, the data of the input 240 passes through, and is processed through, all of the OSI layers between the physical interface 201 and the processors 210, 220, 230.

In order to minimize latency, the processors 210, 220, 230 are configured to prepare the data representing the respective strategies 215, 225, 235 into a form or state that is ready to transmit to the transmission module 202. To do this, the processors 210, 220, 230 are configured to create data packets for transmission over a physical medium to a network, such as network 126, where the data packets represent a respective strategy of a respective processor or processors. For example, a first processor 210 is configured to create a first data packet representing a first strategy 215, a second processor 220 is configured to create a second data packet representing a second strategy 225, and a Nth processor 230 is configured to create a Nth data packet representing a Nth strategy 235. In another example, as discussed above, multiple processors may be used to implement a particular strategy, where a single processor may not generate and transmit a full or complete data packet representative of an entire strategy. In this example, one processor may generate and transmit a generic or partial data packet to be stored in the prestaged packet module 203 and another processor may "complete" the strategy (or data packet representing the strategy) by generating and transmitting a trigger, or a modification and a trigger, when an event occurs, as discussed above.

As discussed above, a message or data packet that is "ready to transmit" or "ready for transmission" means that the data of the message or packet is in a state as if the data has already passed through, and undergone the functions of, the layers of the OSI model up to the Data Link layer. In particular, data in Application layer is ready for transmission to the Data Link layer once the data is in a form or state consistent with a form or state of data that has passed through and been processed by the Application, Presentation, Session, Transport, and Network layers of the OSI model. Application-layer functions typically include identifying communication partners, determining resource availability, and synchronizing communication. When identifying communication partners, the Application layer determines the identity and availability of communication partners for an application with data to transmit. The Presentation layer establishes context between application-layer entities, in which the application-layer entities may use different syntax and semantics if the presentation service provides a mapping between them. The Presentation layer transforms data into a form that the application accepts. This layer formats data to be sent across a network and may include compression functions. The Session layer establishes, manages and terminates the connections between the local and remote application. It provides for full-duplex, half-duplex, or simplex operation, and establishes procedures for checkpointing, suspending, restarting, and terminating a session. The Transport layer creates segments out of the message received from the application layer. Segmentation is the process of dividing a long message into smaller messages. Functions of the Network layer include routing protocols, multicast group management, network-layer information and error, and network-layer address assignment. The Network layer determines network paths, or communication paths, that network devices use to communicate (i.e., which route is suitable from source to destination). Routers may rely on algorithms to determine the best paths, or virtual circuits, for data to travel. It will be appreciated that the various OSI layers described above may include other functions not listed.

Thus, in one embodiment, a data packet, such as the first or second data packets mentioned above, of the one or more processors 210, 220, 230, may be in a state of being ready for transmission (i.e., to the Data Link layer) when the data packet contains segmented data in an ordered format (i.e., a plurality of data segments), the segmented data (i.e., each data segment of the plurality of data segments) being assigned with a source address of the device, a destination address of another device on the network, an established (i.e., suitable) communication path between the source address and the destination address, and a routing protocol for routing the first data packet over the established communication path. While a number of primary characteristics representative of OSI layer functions for the Application, Presentation, Session, Transport, and Network layers have been included above, it will be appreciated that additional or less characteristics may be used to determine when a data packet is able, or ready, to be sent to the transmission module 202 in the Data Link and Physical layers in order to be transmitted to the network 126.

The processors 210, 220, 230 are able to create the data packets as described above and write or store (i.e., prestage) them, in a memory or buffer section of a prestaged packet module 203 via a prestage connection 250, in advance of transmitting the data packets off-chip (i.e., to the network 126). In one embodiment, the prestage connection 250 may be a single connection between the array of processors 210, 220, 230 and the prestaged packet module 203. In another embodiment, the prestage connection 250 may include a plurality of connections, such that each processor 210, 220, 230 has a direct connection to the prestaged packet module 203 through which to write their respective data packets representing strategies 215, 225, 235 into the buffer of the prestaged packet module 203. The latter configuration allows multiple processors to send data packets independently of each other, such that different strategies may be sent individually and independently of each other as well. Hereinafter, reference to accessing, reading, writing and/or storing data packets to the prestaged packet module 203 implies accessing, reading, writing, and/or storing data packets to the memory section of the prestaged packet module 203, as will be described in more detail with reference to FIGS. 3 and 4. In another embodiment, the processors 210, 220, 230 may create the data packets as described above and transmit them directly to the transmission module 202. In this example, the data packets bypass the prestaged packet module 203 and are received directly by the MAC component 204 of the transmission module 202.

In one embodiment, the processors 210, 220, 230 may create portions of their respective data packets and store those portions in the prestaged packet module 203 independently over time. For example, the processors 210, 220, 230 may create and store the portions of data packets one or more at a time, such that the data packets are assembled piece by piece over time until a complete and ready-to-send packet has been constructed. In one example, the portions of data packets may be created and stored sequentially in chronological order. In another example, the portions of data packets may be created and stored in any order (e.g., any one portion of a particular data packet may be created and stored at any time).

The processors 210, 220, 230 have both read and write access to the prestaged packet module 203 and may access the prestaged packet module 203 at any time. By allowing the processors 210, 220, 230 to have full read/write access to the prestaged packet module 203, the processors 210, 220, 230 are able to access and modify their respective data packets, or respective portions of data packets, representing their respective strategies 215, 225, 235 at any time during which the data packets are stored in the prestaged packet module 203. This way, once a data packet (or portion thereof) is created representing a particular strategy, if a user wishes to change a respective strategy they may do so up until the data packet is sent to the transmission module 202 for transmission to the network 126. This maximizes a time window in which a trader can adjust their trading strategies. For instance, if a trader receives market data via input 240 that directly impacts one or more strategies 215, 225, 235 stored in the prestaged packet module 203, the trader may access and modify, via the one or more processors 210, 220, 230 by way of the financial trading or application software, the one or more strategies 215, 225, 235 impacted by the information received, provided the trader makes the modifications prior to the data packets being sent to the transmission module 202. In another example, rather than modifying a particular strategy, multiple data packets representing a particular strategy in alternative form (e.g., one data packet representing a buy strategy for a product and another data packet representing a sell strategy for the same product) may be generated by a respective processor and stored in the prestaged packet module 203 and, based on the input 240 of market data, the respective processor may send a signal or command to trigger one of prestaged data packets to be transmitted (i.e., the respective processor causes one of the prestaged data packets to be sent from the prestaged packet module 203). For example, a buy and sell order for the same symbol could both be prestaged at a certain price and quantity, and a processor associated with one or both of those strategies then triggers one of the two based on the market data it receives.

As discussed above, the processors 210, 220, 230 may create, in whole or in part over time, and store the data packets representing their respective strategies 215, 225, 235 in the prestaged packet module 203 in advance of having the data packets sent to the exchange 101 via the network 126. The processors 210, 220, 230 may send requests 260 to the prestaged packet module 203 to send one or more data packets from the prestaged packet module 203 to the transmission module 202 for transmission over the network 126, as will be discussed in more detail below with respect to FIGS. 3 and 4. The requests 260 may be generated by the processors 210, 220, 230 as instructed by the trader via the financial application software and may be based on data received from the network 126, such as market data received from the exchange 101 via input 240. The prestaged packet module 203 may provide feedback 270 to the one or more processors 210, 220, 230 regarding a status of the data packets, such as whether a data packet has been sent per a request 260 or whether the prestaged packet module 203 may be accessed and modified to alter or replace the data therein. The feedback 270 may be a notification or a descriptor sent back to the one or more processors 210, 220, 230 and/or the user via the financial application software. In one embodiment, the feedback 270 may be sent via a single connection between the prestaged packet module 203 and the array of processors 210, 220, 230. In another embodiment, the feedback 270 may include a plurality of connections, such that each processor 210, 220, 230 may receive the feedback 270 independently of each other. In another example, as mentioned above, the exchange of data packets and/or data between the processors 210, 220, 230 and the prestaged packet module 203 may be bypassed altogether and the processors 210, 220, 230 may send the data packets directly to the transmission module 202.

Figure 2B:
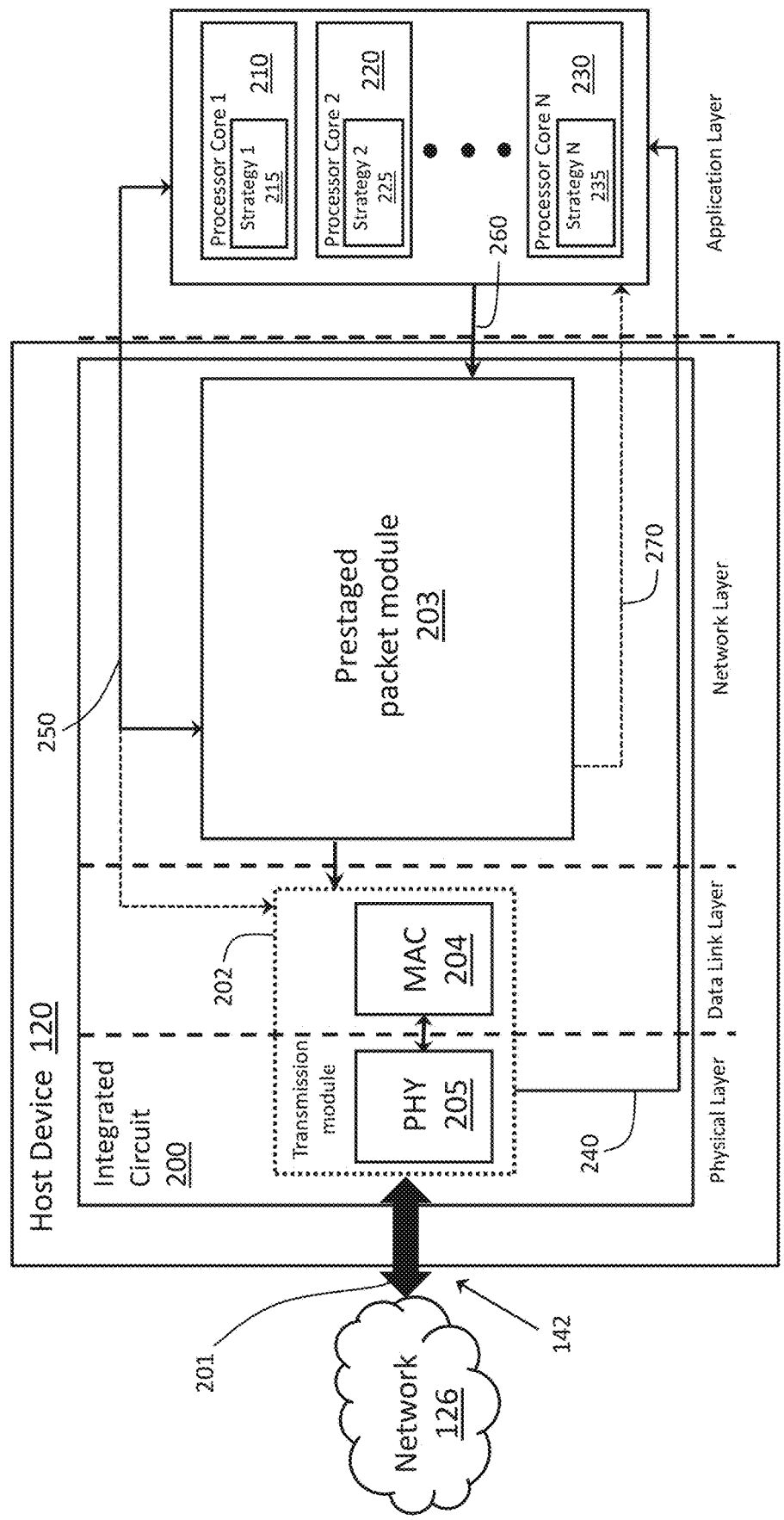
FIG. 2B depicts a block diagram of another exemplary device for communicating messages from the device to a network for use with the system of FIG. 1 according to another embodiment.

FIG. 2B shows a block diagram depicting, in more detail, the host device 120 of the electronic trading system 100 of FIG. 1, according to another embodiment. FIG. 2B is similar in most respects to the host device 120 of FIG. 2A, the main difference being that FIG. 2B illustrates an embodiment where the processor array containing processors 210, 220, 230, and the corresponding OSI layers including the Application layer and all other layers between the Application layer and the Network layer, are not located in the host device 120 (i.e., the processors 210, 220, 230 are "off chip"). In the example shown in FIG. 2B, the processor array containing processors 210, 220, 230 are remotely connected to the prestaged packet module 203 of the host device 120. In another example, the processor array may be located on the host device 120, but not on the same integrated circuit 200 as the prestaged packet module 203 and transmission module 202. As shown in FIG. 2B, the location of the edge 142 described above with respect to FIG. 2A has not changed, and the processors 210, 220, 230, whether on or off chip, may still be remotely connected to the prestaged packet module 203 and transmission module 202 and may still stage, or store, data packets as close to the edge 142 as possible.

Figure 3:
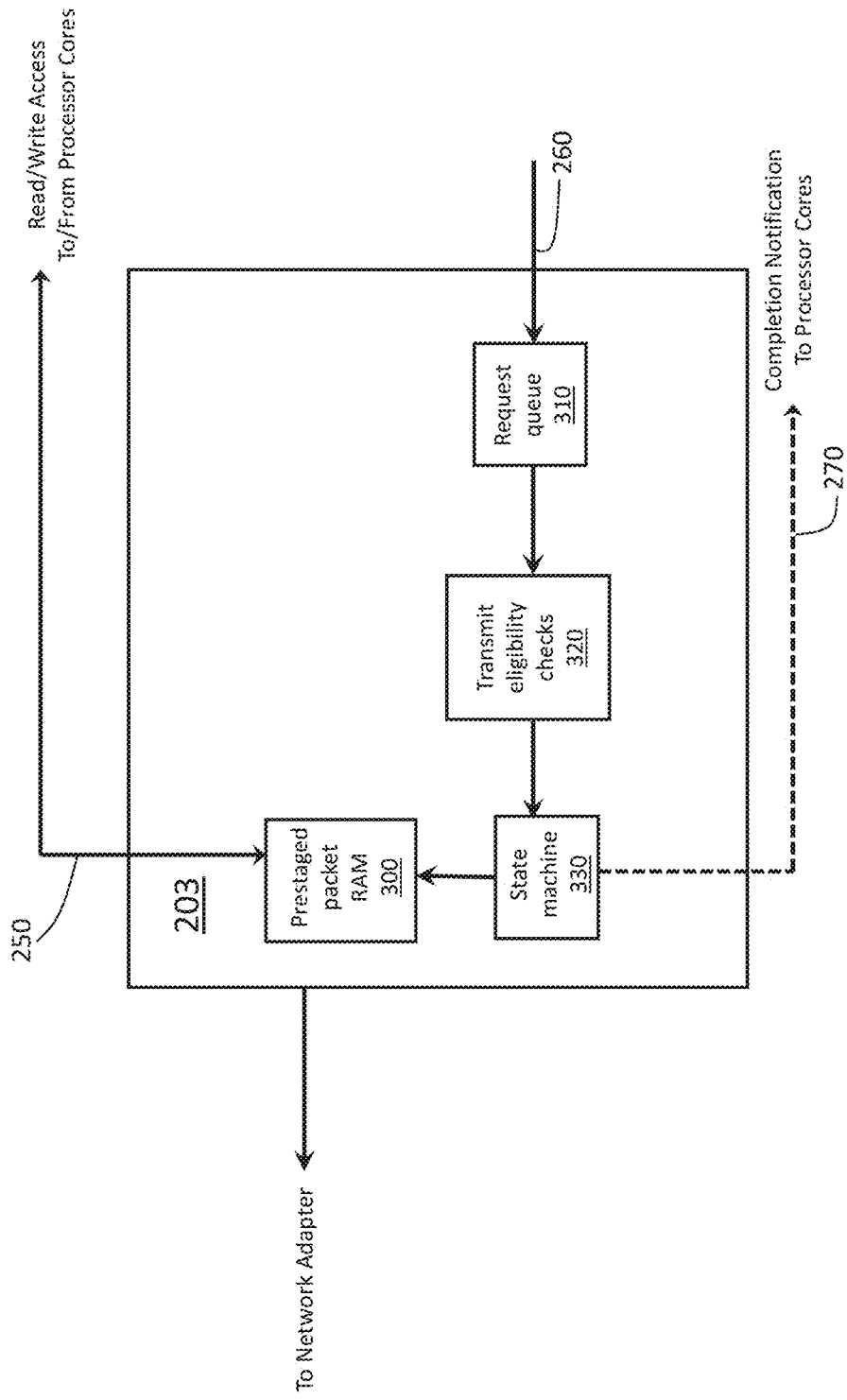
FIG. 3 depicts a more detailed block diagram of the device and prestaged packet component of FIGS. 2A and 2B according to one embodiment.

FIG. 3 shows a block diagram depicting, in more detail, the prestaged packet module 203 of the host device 120 of FIGS. 2A and 2B, according to one embodiment. As shown in FIG. 3, the data packets, or portions thereof, created by the one or more processors 210, 220, 230 are written/stored in a prestaged packet Random Access Memory (RAM) 300, or data buffer, via a prestage connection 250. The prestaged packet RAM 300 is coupled to the one or more processors 210, 220, 230 and configured to receive data packets and/or data directly from any one of the processors 210, 220, 230. As mentioned above, the prestaged packet RAM 300 is able to be read and written directly by the one of the processors 210, 220, 230 by way of the prestage connection 250. As indicated above, the prestage connection 250 may be a single connection between the prestaged packet RAM 300 and the processor/core array or a separate connection between each processor/core and the prestaged packet RAM 300.

As discussed above, to minimize latency, the distance, either physically and/or logically, between the prestaged packet RAM 300 and transmission module 202, and in particular the distance between the prestaged packet RAM 300 and the medium access component 204 of the transmission module 202, is minimized. To accomplish this, the prestaged packet RAM 300 is disposed next to, or closely adjacent, to the transmission module 202. In particular, the prestaged packet RAM 300 is disposed closely adjacent to the medium access component 204 of the transmission module 202. For example, the prestaged packet RAM 300 may be located on the same die, such as the same ASIC die, as the medium access component 204 of the transmission module 202. Even more particularly, the prestaged packet RAM 300 is disposed less than 1500 micrometers from the medium access component 204 of the transmission module 202. In one example, 1500 micrometers may be measured from the furthest corner of the prestaged packet RAM 300 (i.e., the corner furthest away from the medium access component 204) to the nearest edge of the medium access component 204 (i.e., the edge nearest to the prestaged packet RAM 300). In another example, the 1500 micrometers may be the distance between the closest corners or edges of the prestaged packet RAM 300 and the medium access component 204, respectively (i.e., the distance between respective corners or edges that are closest to one another). The terms "next to" and "closely adjacent" indicate a spatial relationship between two components in close proximity to each other, or as geographically close as possible, and may also be referred to as "immediately adjacent," "closely spaced," and the like. These terms may also indicate a logical relationship between two components. In one embodiment, the prestaged packet RAM 300 abuts the medium access component 204 of the transmission module 202. In another example, the prestaged packet RAM 300 and medium access component 204 are coupled to each other and disposed with minimal components in between (i.e., with minimal intervening components, such as wires or traces only). In yet another example, the prestaged packet RAM 300 and medium access component 204 are coupled to each other and disposed with no components in between (i.e., without intervening components). In this regard, the prestaged packet RAM 300 may be disposed closely adjacent, logically, to the medium access component 204, such that latency is minimized, even if the two components are not as geographically close as possible. In one embodiment, the prestaged packet RAM 300 may be disposed relative to the medium access component 204 such that a transmission time for transmission of a data packet from the prestaged packet RAM 300 to the medium access component 204 is 50 nanoseconds or less. In another embodiment, this transmission time may be 20 nanoseconds or less, In yet another embodiment, this transmission time may be 5 nanoseconds or less. Thus, placing the prestaged packet RAM 300 in close proximity, either physically and/or logically, to the transmission module 202, and in particular in close proximity to the medium access component 204 of the transmission module 202, latency of receiving, by the medium access component 204, the first data packet directly from the data buffer is minimized.

The prestaged packet RAM 300 may store data packets in a variety of ways. In one embodiment, the prestaged packet RAM 300 may be divided between respective processors, in which case the prestaged packet RAM 300 may store respective data packets representing respective strategies 215, 225, 235 in different areas or partitions of the memory 300 that are assigned to particular processors. In another embodiment, the prestaged packet RAM 300 may store data packets based on a characteristic or classification of the strategy represented by the data packet. For instance, data packets may be stored in the prestaged packet RAM 300 based on a type of strategy, such as a type of trade order, type of symbols, or type of investment. In another example, data packets may be stored in the prestaged packet RAM 300 based on a classification of risk of the strategies represented by the data packets.

Once the data packets are directly written into the prestaged packet RAM 300, the processors 210, 220, 230 may initiate requests 260 to transmit particular data packets. For example, the first processor 210 may generate a first request to transmit a first data packet representing a first strategy 215 from the prestaged packet RAM 300 to the network 126 and the second processor 220 may generate a second request to transmit a second data packet representing a second strategy 225 from the prestaged packet RAM 300 to the network 126. In one embodiment, a request 260 may include a single command representing a respective data packet as a whole (i.e., in its entirety, as opposed to only a portion or fragment of the data packet, as will be discussed below). As discussed above, a request 260 may be based on data received from the network 126, such as market data received via input 240.

For example, a trader, using financial application software, may create a trade order to buy a certain number of shares of a particular stock at a certain price. A data packet representing this strategy is created by a processor of the trader's host device 120 and is written directly into the prestaged packet RAM 300 in a "ready to transmit" state, as described above. The data packet remains in the prestaged packet RAM 300 until an instruction is received to send the data packet to the transmission module 202 for transmission to the exchange 101 via the network 126. A request 260 to send the data packet initiates such an instruction. In this example, the trader may receive market data that indicates the price of the stock that the trader intends to buy may soon fluctuate. Based on this received market data from the network 126, the trader sends a request to send the first data packet from the prestaged packet RAM 300 to the transmission module 202 for transmission to the exchange 101 via the network 126, such that the trade order is sent and fulfilled before the price changes. In another example, suppose the market data received by the trader caused the trader to want to modify their trade order to increase the number of shares they intend to buy via their trade order. In this case, the trader is able to access and modify the data packet in the prestaged packet RAM 300, using the financial application software, which instructs the processor associated with the trade order. In this case, the trader may change his trade order to increase the number of shares. The modified data packet is then re-saved into the prestaged packet RAM 300 and will be sent out to the exchange 101, provided that the modification is made and stored prior to the data packet being sent out of the prestaged packet RAM 300 due to the initial request. In yet another embodiment, the trader may create, using financial application software and a processor of the trader's host device 120, a data packet representing a trade order that is in a "ready to transmit" state and cause the processor to transmit the data packet directly to the transmission module 202 for transmission to the exchange 101 via the network 126, thereby bypassing the prestaged packet RAM 300.

In one embodiment, the prestaged packet module 203 of the integrated circuit 200 includes a request queue 310 configured to receive requests, such as a request 260 from the first processor 210, the second processor 220, or the first processor 210 and the second processor 220 to transmit or provide the first data packet, the second data packet, or the first data packet and the second data packet, respectively, from the prestaged packet RAM 300 to the network 126. In the embodiment where requests 260 to send prestaged data packets are single commands, the requests 260 can all be placed in one request queue 310 even if the requests 260 come from multiple requestors. In this embodiment, there are multiple strategies 215, 225, 235 associated with multiple processors 210, 220, 230, where the processors 210, 220, 230 send their requests to a single request queue 310. This results in an ordering of requests dependent on the request arrival time at the request queue 310 (i.e. there is a race between the strategies to the queue). In this regard, the request queue 310 is configured to receive a plurality of requests 260 from a plurality of processors 210, 220, 230 and process each request 260 of the plurality of requests 260 based on when each of the requests 260 were received by the request queue 310.

Each request 260 may include information about the data packet being requested to send. This information may be a data field in the request and may include a strategy identifier, a transmit eligibility status or check field, and prestaged RAM pointers. The prestaged RAM pointers identify the location in the prestaged packet RAM 300 where the data packet is stored. This can be a start and end pointer, or a start pointer and a length value. The strategy identifier field is returned in the completion notification 270 when a request 260 is processed. It allows a processor to identify the completion notification 270 as being for an earlier request by the same processor. The transmit eligibility field is used by the transmit eligibility checks logic, discussed below, to determine if the data packet is allowed to be transmitted or not.

Conventional, off-the-shelf network cards typically implement queues in the host. However, this usually involves higher latency due a link, such as a PCI express link, between the host and the network card. By implementing the request queue 310 in the data path on the integrated circuit 200 (i.e., off host), latency is minimized.

The prestaged packet module 203 of the integrated circuit 200 also includes a transmission eligibility checker 320 in communication with the request queue 310. The transmission eligibility checker 320 is configured to determine, after the request queue 310 receives a respective request 260 from a respective processor of the one or more processors 210, 220, 230, whether a respective data packet of the respective processor is eligible to be transmitted over the physical medium to the network 126 based on a transmit eligibility state. The transmit eligibility state is used to determine whether a data packet identified in the request 260 is allowed to be sent (i.e., allowed to be transmitted from the prestaged packet RAM 300 to the transmission module 202). The transmit eligibility state is persistent between consecutive data packets and updated after each transmission of a data packet to the network 126. The transmit eligibility state may be modified by a controller, such as one of the one or more processors 210, 220, 230, and may use rules to determine what types of data packets may be sent. The rules may be software rules and may be based on a classification, such as a class of risk or types of trades. It will be appreciated that many other types of classifications or rules may be used to determine whether or not a data packet is allowed to be sent, and that these rules may be dependent on particular traders and/or exchanges.

In one embodiment, the transmit eligibility state is 32 bits. It will be appreciated that other quantities of bits may also be used as the transmit eligibility state. Each request 260 sent to the request queue 310 includes a 32-bit field as the transmit eligibility field. The transmit eligibility field of the request 260 at the front of the queue is compared to the transmit eligibility state. If any bit set in the request's field is set in the transmit eligibility state, then the data packet is not retrieved from the prestaged packet RAM 300 and a completion notification 270 is sent back to the processor associated with the strategy identified in the request 260 to notify the processor of the outcome. If none of the bits that are set in the request's transmit eligibility field are also set in the transmit eligibility state, then the data packet is retrieved from the prestaged packet RAM 300 and sent from the physical interface 201 to the exchange 101 and a completion notification 270 is sent to the processor associated with the strategy identified in the request 260. A logical OR function is then performed on the transmit eligibility state and the transmit eligibility field from the request 260.

Generally speaking, the transmit eligibility field contains a description of a set of quantities or conditions to be checked before a data packet is allowed to be sent. A failure to pass any one of those checks would result in that data packet not being sent. Further, if the data packet is successfully sent then some or all of those quantities may be adjusted so that the sending of subsequent data packets is therefore dependent on the data packets that have been previously sent. In other words, the transmission eligibility checker 320 is configured to compare a transmit eligibility field of a respective request 260 to the transmit eligibility state and either determine not to transmit the respective data packet to the network 126 when any bit set in the transmit eligibility field of the respective request 260 is set in the transmit eligibility state or determine to transmit the respective data packet to the network 126 when no bits set in the transmit eligibility field of the respective request 260 are set in the transmit eligibility state.

It will be appreciated that additional alternative embodiments of this transmit eligibility check may be implemented by the transmission eligibility checker 320. For example, rather than a set of bits as discussed above, a collection of counters may be used. In this case, transmit eligibility checks can check a subset of those counters to determine if they are each above some specified value, which can be specific for each counter. Assuming that the subset of counters all are above respective specified values, then a data packet is allowed to be sent and the counters are then decremented by their associated value. This can be used to set limits on risk, for example, by limiting the total quantity of a particular instrument that is allowed to be sent. An important aspect of any transmit eligibility check is that a state is held in the transmission eligibility checker 320 that persists between each of the requests 260 that are processed and that the state is updated by those requests 260 so that subsequent requests 260 in the request queue 310 are only allowed to be sent if the data packets that have already been sent beforehand allow it. In this way, respective strategies 215, 225, 235 of respective processors 210, 220, 230 may work out discrepancies amongst each other. For example, whenever a request is processed for a particular data packet, a descriptor is returned to the originating processor for a respective strategy that indicates whether the data packet was sent or not and, if it was not sent, then the descriptor indicates the reason why (i.e., which transmit eligibility check failed). On receipt of one of these failure notifications, the processor can choose to make a request to a central resource management process to allocate more resource or the processor could choose to resubmit the order with other/updated characteristics that will not result in failure.

The prestaged packet module 203 of the integrated circuit 200 also includes a state machine 330 in communication with the transmission eligibility checker 320 and the prestaged packet RAM 300. The state machine 330 may be configured to provide a transmission status 270 of a respective data packet to a respective processor based on the determination by the transmission eligibility checker 320, discussed above. The transmission status may specify whether the respective data packet is eligible to be transmitted to the network 126. As discussed above, the transmission status 270 may also be indicative of whether the respective data packet has been transmitted (i.e., completion notification). As previously discussed, the completion notification 270 may be a single connection to the array of processors 210, 220, 230 or separate connections each of the processors 210, 220, 230.

The state machine 330 may be configured to read data from the prestaged packet RAM 300 using the prestaged RAM pointers fields in a request 260. In an embodiment where the request 260 includes a start and end pointer to the prestaged packet RAM 300 for a start and end position of a data packet (or data packet fragment), the state machine 330 operation is to read the prestaged packet RAM 300 sequentially from the start pointer to the end pointer and to then pass that data packet to the medium access component 204 of the transmission module 202 for framing and sending to the exchange 101 via the network 126.

The arrangement and functionality of the request queue 310, the transmission eligibility checker 320, the state machine 330, and the prestaged packet RAM 300 provide a mechanism to ensure that a data packet that has been prestaged in a prestaged packet RAM 300 is safe to be sent when requested to do so, even when that data packet may have been prestaged some time previously and even though many other data packets may have been sent in the interim. The disclosed combination of components also provides a mechanism to ensure that the same data packet is not sent twice incorrectly. The disclosed embodiments also provide a rate limiting function, since it is not desirable for a processor to keep trying repeatedly to send the same data packet unsuccessfully. With the completion notification function 270, a user does not need to initiate another duplicate trade order since the user is told whether the first transaction was successful or not. In other words, data packets are processed in order and each one can update state to ensure that a second data packet of the same type as a first data packet is not sent, even if second data packet of the same type were immediately behind the first data packet in the queue. The prestaged packet RAM 300 is also configured to limit a rate at which data is read from the prestaged packet RAM 300, such that a time frame for modifying the first data packet by the first processor 210 is maximized.

As discussed above, there is a need to maximize the window of time that traders have to alter or modify their trading strategies, such as previously generated trade orders, that have not yet been transmitted. Allowing traders to directly modify prestaged data packets in a prestaged packet RAM 300 immediately adjacent to, logically and/or physically, the medium access component 204 of the transmission module 202 essentially moves the line demarcating when a trader gives up control over their trade orders. Typically, control over a trade order is relinquished prior to the Transport or Network layer of the OSI model. Once the financial application software in the Application layer hands off the data representing the trade order, a trader is limited in terms of their ability to alter the course of the trade order. In contrast, the improved networking architecture of the disclosed embodiments allow control to be retained by traders up until the trade order is sent directly from the prestaged packet memory 300 to the Ethernet MAC component 204. Thus, control is maintained up to the Data Link layer of the OSI model. In this regard, the prestaged packet module 203 of the disclosed embodiments replaces at least the Network and Transport layers of the OSI model, since these functions were previously handled by the processors 210, 220, 230, as described above. However, once a processor sends a request 260 to send a particular data packet, this time window for modifying a trade order is limited to the time it takes for the request 260 to pass through the request queue 310, the transmission eligibility checker 320, and the state machine 330. Once the state machine 320 determines a data packet is eligible to be transmitted and instruction is given to the prestaged packet RAM 300 to send the data packet to the transmission module 202, the data packet is no longer able to be modified. Thus, once a trader sends a request to send a packet, it becomes a race to modify the data packet before the instruction is sent to transmit the data packet.

Figure 4:
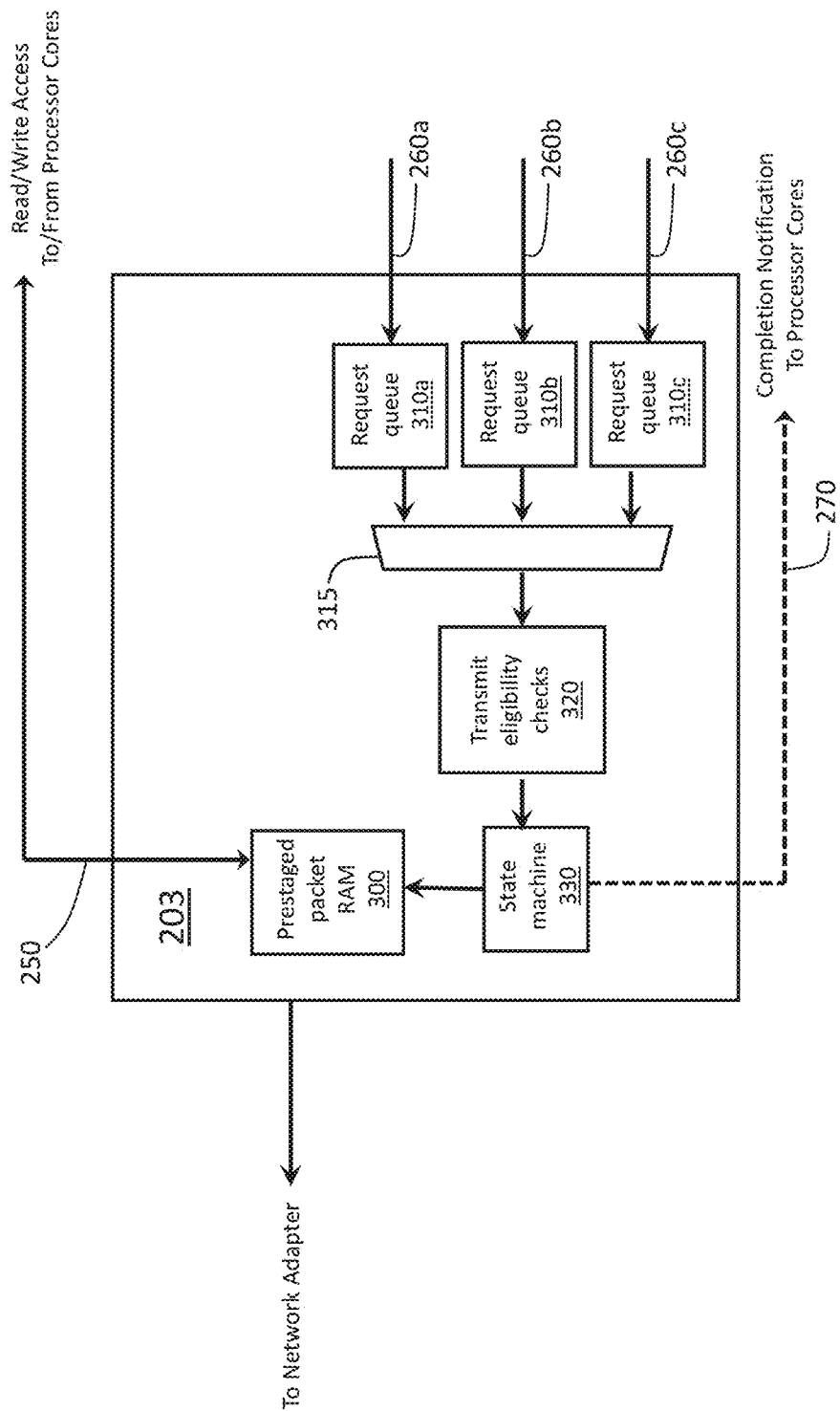
FIG. 4 depicts another detailed block diagram of the device and prestaged packet component of FIGS. 2A and 2B according to one embodiment.

An alternative embodiment of the prestaged packet module 203 of the host device 120 is shown in FIG. 4. In the previous embodiment of FIG. 3, each data packet to be sent from the prestaged packet RAM 300 is described fully by a single request 260, as there are multiple strategies 215, 225, 235 or respective processors 210, 220, 230 sharing a single request queue 310 and requests 260 from each processor 210, 220, 230 may be sent at any time. The alternative embodiment of FIG. 4 illustrates how to support prestaged data packets that are defined by a series of requests to send start-middle-middle-end fragments of a data packet. The alternative embodiment of FIG. 4 allows each processor 210, 220, 230 to send a data packet as a sequence of fragments read from the prestaged packet RAM 300 (i.e. a start-middle-end set of fragments). In other words, a request 260 includes a series of commands, each respective command in the series of commands representing a respective portion, or fragment, of a data packet. In this case, each respective portion of the data packet is stored in the prestaged packet RAM 300, such that the data packet is assembled from the respective portions of the data packet in the prestaged packet RAM 300 based on the series of commands of the request. The portions or fragments may be stored in the prestaged packet RAM 300 at arbitrary locations in the memory. To be able to support this, each processor 210, 220, 230 may have its own request queue 310a-c into which each processor 210, 220, 230 may place a request 260a-c to send a fragment of the data packet. The architecture of this alternative embodiment allows processors 210, 220, 230 that operate independently of one another to avoid inter-mixing of fragment requests, which would result in a corrupted data packet being sent. An arbiter 315 may be provided between the request queues 310a-c and the transmission eligibility checker 320 to help with this process of allocating access to shared resources. In one example, the arbiter 315 may use a round-robin arbitration scheme. Other arbitrations schemes may be used, such as a priority-based arbitration scheme (i.e., assigning different levels of priority to each queue and draining the queues in order of the priority). In another example, the arbitration scheme may include remembering the order of arrival for each request in each queue and to arbitrate between the queues based on that arrival order so that the data packets are sent in the same order that their associated requests arrived at the prestaged packet RAM 300.

For example, in the embodiment shown in FIG. 4, a first processor 210 may create a first data packet having three fragments. These three fragments of the first data packet may be stored in the prestaged packet RAM 300 as three separate entries, each with its own fragment identifiers. A second processor 220 may create a second data packet having four fragments, each of those fragments also being stored in the prestaged packet RAM 300 independently. Without separate request queues 310a-c as shown in FIG. 4, if the first processor 210 sends a request to send the first of three fragments of the first data packet and then the second processor 220 immediately thereafter sends a request to send the first of four fragments of the second data packet, a single request queue 310 may treat these fragments as coming from a single processor and retrieve the respective fragments (i.e., one from the first data packet and one from the second data packet) from the prestaged packet RAM 300 and assemble them together, which would cause a corrupted data packet being sent, since those respective fragments were never meant to be assembled together, since they belong to separate strategies of different processors.

In another embodiment, the disclosed system may include the ability to trigger the sending of prestaged data packets from a hardware defined trigger or to send the head of a packet from the hardware trigger and then have local CPU complete the tail based on alpha. For example, the amount of storage space available in the prestaged packet RAM 300 may be limited and there may not be enough space available to store all of the required combinations of a particular order (instrument, price, quantity, etc.). In this example, the prestaged packet RAM 300 may be used to store only part of the order data packet up to the point where there are many different possibilities of fields to be sent. Those fields would be provided by a local CPU, which would calculate the values on-the-fly as the market data arrived. The CPU would then pass the bytes to be sent to the prestaged packet RAM 300. In this case, the bytes would be sent as a series of commands.

As shown in FIG. 4, the prestaged packet module 203 of the host device 120 includes a first request queue 310a configured to receive a first request 260a from the first processor 210 to transmit or provide the first data packet from the prestaged packet RAM 300 to the network 126. The prestaged packet module 203 also includes a second request queue 310b configured to receive a second request 260b from the second processor 220 to transmit the second data packet from the prestaged packet RAM 300 to the network 126. As discussed above, the first request 260a includes a series of commands, each respective command in the series of commands representing a respective portion of the first data packet. Each respective portion of the first data packet is stored in the prestaged packet RAM 300, such that the first data packet is assembled from the respective portions of the first data packet in the prestaged packet RAM 300 based on the series of commands of the first request 260a.

In both of the embodiments discussed with respect to FIGS. 3 and 4, once the data packet is approved to send, the data packet is transmitted directly to the transmission module 202 by the prestaged packet RAM 300, and in particular, to the MAC component 204 of the transmission module 202. Given the close proximity of the prestaged packet RAM 300 to the MAC component 204 of the transmission module 202, the time it takes to transmit the data packet between these two components is greatly reduced, thereby minimizing latency.

Referring back to FIG. 2A, the integrated circuit 200 of the host device 120 includes a transmission module 202 (i.e., network adapter) coupled to the prestaged packet RAM 300 and configured to receive the first data packet directly from the prestaged packet RAM 300 and transmit (i.e., provide or convey) the first data packet to the network 126 via the physical medium (e.g., Ethernet cable). In particular, the transmission module 202 includes a medium access component 204 (e.g., MAC) in communication with the prestaged packet RAM 300 and operative to control access to the physical medium and coordinate transmission and reception of data packets therethrough. The MAC 204 is configured to receive the first data packet directly from the prestaged packet RAM 300 and encapsulate the first data packet into a frame suitable for transmission over the network 126, the frame being a binary sequence of bits. The transmission module 202 also includes a transceiver component 205 (e.g., PHY) in communication with the MAC 204 and the physical medium. The PHY 205 is operable to convert a message for transmission into a form compatible with the physical medium. More specifically, the PHY 205 is configured to receive the binary sequence of bits of the frame from the MAC 204 and convert the binary sequence of bits into signals. The transmission module 202 also includes a physical interface 201 (e.g., physical connection) to the physical medium, the physical interface 201 being in communication with the PHY 205 and operative to receive signals from the PHY 205 and transfer the signals to the physical medium. In this regard, the physical interface 201 may be a physical connection between the network 126 and the device 120. The physical interface 201 may be operable to receive a modular connector, such as an RJ45, SFP, or SFP+ connector, and configured to form a connection, such as an electrical connection, with the physical medium. In one embodiment, the physical interface 201 includes portions adapted to receive pins or wires of the modular connector of the physical medium. In this regard, the physical interface 201 may also be referred to as a jack, socket, or connector, such as a RJ45 connector, SFP connector, or SFP+ connector, or antenna.

In one embodiment, the trader's host device 120 may include a plurality of integrated circuits 200 or other interconnecting infrastructures, each with its own physical interface 201 that services a separate array of multi-core processors. In another embodiment, the disclosed network interface architecture may be used in conjunction with (i.e., in addition to or in parallel with) traditional network protocol stacks.

Figure 5:
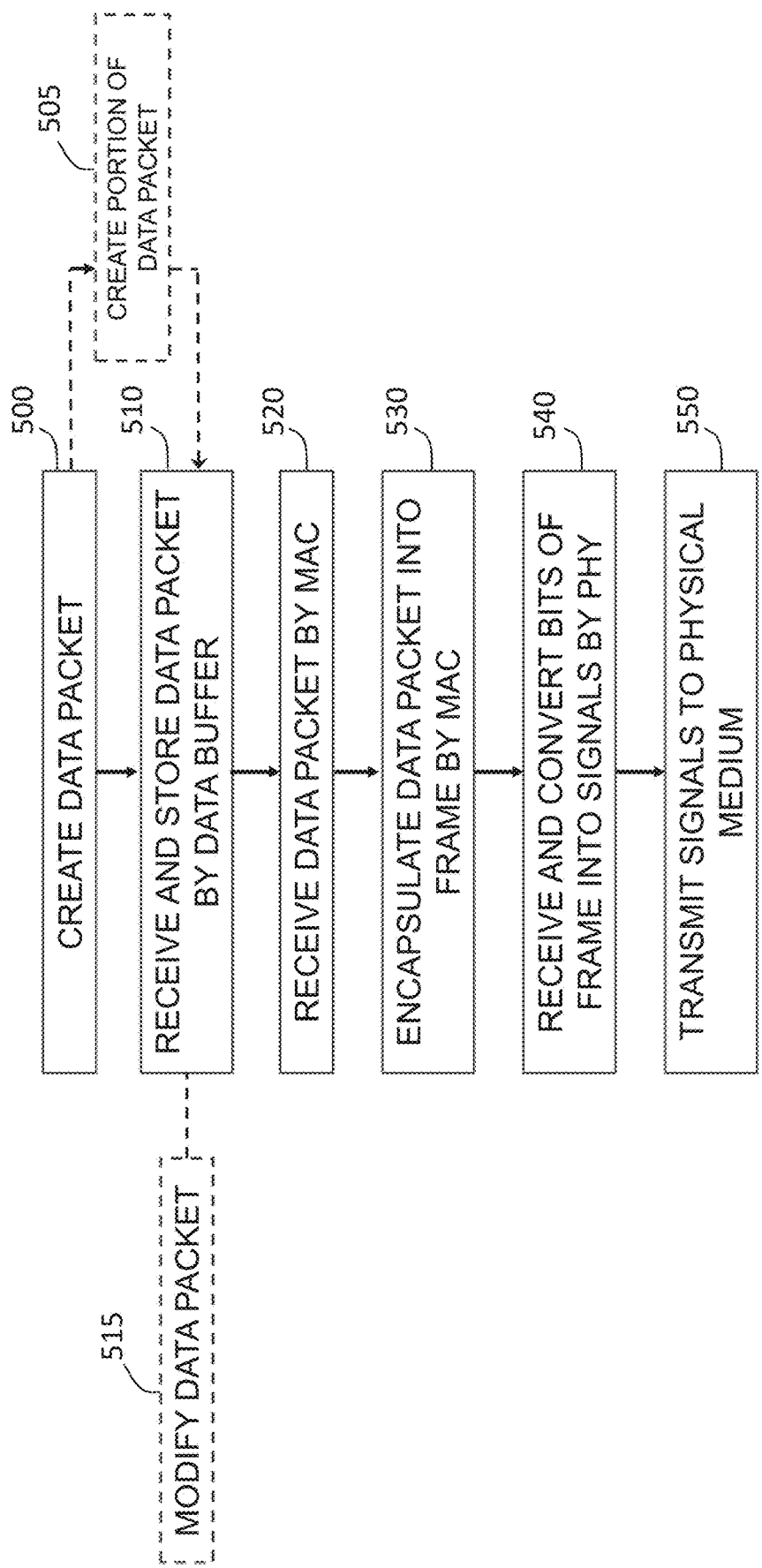
FIG. 5 depicts a flow chart showing operation of the device of FIGS. 2A and 2B according to one embodiment.

FIG. 5 depicts a flow chart showing operation of the device 120 of FIGS. 2A and 2B. In particular, FIG. 5 shows a computer implemented method for communicating messages, e.g. financial transactions, such as trade orders to trade a financial product, from a device, such as the device 120 of FIGS. 2A and 2B, over an electronic communications network, such as the network 126 of FIG. 1, via a physical medium, such as copper or optical fiber, or over a radio link. While the operation of FIG. 5 is discussed below with reference to the device 120 of FIGS. 2A and 2B, the operation may be implemented using any of the devices 114, 116, 118, 120, 122 and 132 of FIG. 1. Other devices may also be used. The operation generally includes creating a data packet (Block 500), receiving and storing the data packet by a data buffer (Block 510), receiving the data packet by a MAC component (Block 520), encapsulating the data packet into a frame by the MAC component (Block 530), receiving and converting bits of the frame into signals by a PHY component (Block 540), and transmitting the signals to a physical medium to be communicated over the network (Block 550). Additional, different, or fewer indicated acts may be provided. For example, the data packets may be created and stored in portions (Block 505). In another example, the data packet stored in the data buffer may also be modified (Block 515). The indicated acts may be performed in the order shown or other orders. The indicated acts, alone or in combination, may also be repeated, for example, creating a data packet (Block 500), creating a portion of a data packet (Block 505), receiving and storing the data packet (or portions) by a data buffer (Block 510), and modifying the data packet stored in the data buffer (Block 515) may be repeated. The indicated acts may also be performed automatically, either individually or as a whole, by the electronic trading system 100 as described above.

The operation of the device 120 includes creating, by a first processor 210 of one or more processors 210, 220, 230, a first data packet for transmission over a physical medium, such as copper or optical fiber, or over a radio link, from a device 120 to a network 126 (Block 500). The first data packet may be created by a user, such as trader, using any of the previously described workstations and/or interfaces 114, 116, 118, 120, 122 and 132 of FIG. 1. For example, a trader, using a financial application software on a device 114, 116, 118, 120, 122 or 132, may perform functions of the financial application software to generate a trade order. In this example, the financial application software then causes the first processor 210 to create the first data packet representing the trade order, or strategy, generated by the trader via the financial application software. In one embodiment, as was described above, the first data packet may be in a state ready for transmission to a medium access component, such as MAC 204 described above in FIG. 2A. This state may be a state as if the data packet has already passed through, and undergone the functions of, the Application, Presentation, Session, Transport, and Network layers of the OSI model, as described above. For example, the first data packet created by the first processor 210 may include a first plurality of data segments in an ordered format, where each data segment of the first plurality of data segments is assigned with a source address of the device 120, a destination address of another device on the network 126, an established communication path between the source address and the destination address, and a routing protocol for routing the first data packet over the established communication path. The state of the data packet created by the first processor 210 may contain other characteristics and properties as well, including other functional aspects of the Application, Presentation, Session, Transport, and Network layers of the OSI model.

As indicated above, in one embodiment of the operation of the device 120, the creation of the first data packet (Block 500 above) may also include creating, by the first processor 210, a first portion of the first data packet for storage in the prestaged packet RAM 300 (Block 505). As discussed above, the processors 210, 220, 230 may create and store the portions of data packets one at a time, such that the data packets are assembled piece by piece over time. In one example, the portions of data packets may be created by the processors 210, 220, 230 and stored by the prestaged packet RAM 300 sequentially in chronological order. In another example, the portions of data packets may be created and stored in any order (e.g., any one portion of a particular data packet may be created and stored at any time).

The operation of the device 120 further includes receiving, by a prestaged packet RAM 300 coupled to the first processor 210, the first data packet directly from the first processor 210 and storing, by the prestaged packet RAM 300, the first data packet (Block 510). In one embodiment, as was described above, the prestaged packet RAM 300 may receive the first data packet from the first processor 210 via a prestage connection 250 and prestage, or store, the first data packet in advance of transmitting the data packets off-chip (i.e., to the network 126). In one embodiment, the prestage connection 250 may be a single connection between the array of processors 210, 220, 230 and the prestaged packet RAM 300. In another embodiment, the prestage connection 250 may include a plurality of connections, such that each processor 210, 220, 230 has a direct connection to the prestaged packet RAM 300 through which to write their respective data packets representing strategies 215, 225, 235 into the prestaged packet RAM 300. This allows multiple processors, such as processors 210, 220, 230, to send data packets independently of each other, such that different strategies may be sent individually and independently of each other as well.

As discussed above, the first data packet may be prestaged or stored in the prestaged packet RAM 300 in any number of formats. In one embodiment, the first data packet is stored in the prestaged packet RAM 300 based on a type of strategy, such as a type of trade order, type of symbols, or type of investment. In another example, the first data packet may be stored in the prestaged packet RAM 300 based on a classification of risk of the strategies represented by the first data packet. In one embodiment, the first data packet may be stored in the prestaged packet RAM 300 with assigned identifier information, such as prestaged RAM pointers, which identify the location in the prestaged packet RAM 300 where the first data packet is stored. The first data packet may also be stored in the prestaged packet RAM 300 with other types of identifier information, such as an identifier that identifies which processor the first data packet is associated with, such as the first processor 210.

As indicated above, the operation of the device 120 may also include modifying, by the first processor 210, the first data packet while the first data packet is stored in the prestaged packet RAM 300 (Block 515). In one embodiment, as was described above, each of the one or more processors 210, 220, 230 may have direct read and write access to the prestaged packet RAM 300, which allows the data packets stored in the prestaged packet RAM 300 to be modified. In one embodiment, this modification may be based on data, such as market data or news data, received by the first processor 210 from a source, such as an exchange 101 or a news source. It will be appreciated that motivation for modifying a trading strategy represented by the data packets in the prestaged packet RAM 300 may be based on any sort of data received by the trader, whether via the financial application software or any other source, or may simply be based on a trader changing their mind as to their trading strategy.

The operation of the device 120 further includes receiving, by a medium access component 204 (i.e., MAC 204) in communication with the prestaged packet RAM 300, the first data packet directly from the prestaged packet RAM 300 (Block 520). In one embodiment, as was described above, the MAC 204 may be an integrated component of a network or network adapter, such as transmission module 202, and may implement the functions of the Data Link layer of the OSI model. The MAC 204 may be operative to control access to the physical medium and coordinate transmission and reception of data packets therethrough. It will be appreciated that the MAC 204 may perform other functions typically associated with now known or later developed medium/media access control components.

In one embodiment of the operation of the device 120, the prestaged packet RAM 300 is disposed closely adjacent, either physically and/or logically, to the medium access component 204 to minimize latency of the receiving, by the medium access component 204, of the first data packet directly from the prestaged packet RAM 300 (i.e., Block 520 above). As discussed above, the prestaged packet RAM 300 may be disposed within a threshold distance from the MAC 204 on the integrated circuit 200 of the host device 120. For example, the prestaged packet RAM 300 may be disposed less than 1500 micrometers from the MAC 204. In another example, the prestaged packet RAM 300 may abut the MAC 204. In yet another example, the prestaged packet RAM 300 and the MAC 204 may be disposed relative to each other such that minimal, or no, intervening components are present. Intervening components may be hardware components, such as wires, transistors, capacitors, or any other electronic circuitry components, or software components, such modules or logic functions. In another example, the prestaged packet RAM 300 and the MAC 204 may be disposed relative to each other such that a transmission time for transmission of a data packet from the prestaged packet RAM 300 to the MAC 204 is 50 nanoseconds or less. Positioning the prestaged packet RAM 300 and the MAC 204 in close proximity to each other, either physically and/or logically, reduces the latency of sending or communicating data between them.

The operation of the device 120 further includes encapsulating, by the medium access component 204, the first data packet into a frame suitable for transmission (Block 530). In one embodiment, as was described above, the frame may be a binary sequence of bits.

The operation of the device 120 further includes receiving, by a transceiver component 205 (i.e., PHY 205) in communication with the medium access component 204 and the physical medium, the binary sequence of bits of the frame and converting, by the transceiver component 205, the binary sequence of bits into signals (Block 540). In one embodiment, as was described above, the PHY 205 may be an integrated component of a network adapter, such as transmission module 202, and may implement the functions of the Physical layer of the OSI model, including both Physical Coding Sublayer (PCS) and Physical Medium Dependent (PMD) layer functionality. The PHY 205 may be responsible for the transmission and reception of unstructured raw data, such as raw bit streams, between a device, such as device 120, and a physical transmission medium, such as copper or optical fiber, or over a radio link, on a network 126. The PHY 205 may be operative to convert digital bits into electrical, radio, or optical signals. The PHY 205 may also controls characteristics such as voltage levels, the timing of voltage changes, physical data rates, maximum transmission distances, modulation scheme, channel access method and physical connectors, including the layout of pins, voltages, line impedance, cable specifications, signal timing and frequency for wireless devices. It will be appreciated that the PHY 205 may perform other functions typically associated with now known or later developed physical layer components, such as electronic circuitry required to implement the Physical layer functions of the OSI model.

The operation of the device 120 further includes transmitting, by an output port 201 of the device 120 in communication with the transceiver component 205, the signals to the physical medium (Block 550). In this regard, the output port 201 may be a physical interface between the network 126 and the device 120. In one embodiment, as was described above, the output port 201 may be an integrated component of a network adapter, such as transmission module 202, and may be referred to as an physical interface, jack, or connector, such as a RJ45 connector, SFP connector, or SFP+ connector, or antenna that is used to connect to a physical medium such as an Ethernet cable or radio spectrum.

As shown above, the improved network architecture of the disclosed embodiments allows for minimizing latency of preparing and sending data to a network over a physical medium while maximizing a window of opportunity by allowing the data to be modified for an extended period of time prior to transmission. The proposed embodiments bypass a number of OSI layers to improve latency and retain user control up until the data is transmitted to the Data Link layer. Ready-to-send data packets are assembled and stored in a prestaged packet memory next to or as close as possible, either physically and/or logically, to the MAC component to reduce latency. The ready-to-send data packets are also modifiable by the one or more processors, such that a trader may modify a trade order stored in the prestaged packet memory for a period of time up until the trade order is sent directly from the prestaged packet memory to the MAC component of a network interface. A technical advantage achieved by storing ready-to-submit data packets next to the MAC component of the network interface is that it lowers latency by reducing the amount of time needed to transmit a data packet to the MAC component, thereby reducing the total time needed to transmit the data packet to the network. Examples include, but are not limited to: (1) a host triggering a prestaged data packet to be sent from the prestaged packet memory to the MAC component; (2) a host sending data to modify a data packet stored in the prestaged packet memory and then triggering that data packet to be sent from the prestaged packet memory to the MAC component; and (3) local hardware on the network interface card triggering a data packet (that may have been previously stored and/or modified by a host) to be sent from the prestaged packet memory to the MAC component. The improved network architecture of the disclosed embodiments also allows for scalability of the number of strategies being managed and processed by a trader on an individual computing device.

One having ordinary skill in the art will appreciate that one or more functions/modules described herein may be implemented using, among other things, a logic component such as a reconfigurable logic component, e.g. an FPGA, which may include a logical processing portion coupled with a memory portion, or as a tangible computer-readable medium comprising computer-executable instructions (e.g., executable software code) executable by a processor coupled therewith to implement the function(s). Alternatively, functions/modules may be implemented as software code, firmware code, hardware, and/or a combination of the aforementioned. For example, the functions/modules may be embodied as part of an electronic trading system 100 for financial instruments.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, a data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits (ASICs), programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of ordinary skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Reference in this specification to "one embodiment" or "an embodiment" means that a particular feature, structure, or characteristic described in connection with the embodiments is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of ordinary skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system for communicating messages over an electronic communications network, the system being operative to transmit the messages from a device to the network via a physical medium, the system comprising:
    a first processor of one or more processors, implemented in an application layer of an open systems interconnection (OSI) reference model, configured to create a first data packet for transmission over the physical medium to the network, the first data packet comprising a first plurality of data segments in an ordered format, each data segment of the first plurality of data segments being assigned with a source address of the device, a destination address of another device on the network, an established communication path between the source address and the destination address, and a routing protocol for routing the first data packet over the established communication path;
    a data buffer coupled with the first processor and configured to receive at least a portion the first data packet directly from the first processor and store the first data packet; and
    a network adapter coupled to the data buffer and configured to receive the first data packet directly from the data buffer and transmit the first data packet to the network via the physical medium, the network adapter comprising:
    a medium access component in communication with the data buffer and operative to control access to the physical medium and coordinate transmission and reception of data packets therethrough, wherein the medium access component is configured to receive the first data packet directly from the data buffer and encapsulate the first data packet into a frame suitable for transmission, the frame being a binary sequence of bits;
    a transceiver component in communication with the medium access component and the physical medium, the transceiver component operable to convert a message for transmission into a form compatible with the physical medium, wherein the transceiver component is configured to receive the binary sequence of bits of the frame and convert the binary sequence of bits into signals; and
    a physical connection to the physical medium, the physical connection being in communication with the transceiver component and operative to receive signals from the transceiver component and transfer the signals to the physical medium, the physical connection being a physical interface between the network and the device.

2. The system of claim 1, wherein the first data packet is modifiable by the first processor while the first data packet is stored in the data buffer prior to transmission to the network.

3. The system of claim 1, wherein the data buffer is disposed closely adjacent to the medium access component to minimize latency.

4. The system of claim 1, wherein the data buffer is disposed relative to the medium access component such that a transmission time for transmission of the first data packet from the data buffer to the medium access component is 50 nanoseconds or less.

5. The system of claim 1, further comprising:
    a second processor of the one or more processors configured to create a second data packet for transmission over the physical medium to the network, the second data packet containing a second plurality of data segments in an ordered format assigned with the source address for the device, the destination addresses of the other device on the network, the established communication path between the source address and the destination address, and the routing protocol for routing the first data packet over the established communication path; and
    a request queue configured to receive a request from the first processor, the second processor, or the first processor and the second processor to transmit the first data packet, the second data packet, or the first data packet and the second data packet, respectively, from the data buffer to the network.

6. The system of claim 5, wherein the request comprises a single command representing a respective data packet as a whole, the request being based on data received from the network.

7. The system of claim 5, wherein the request queue is configured to receive a plurality of requests from a plurality of processors and process each request of the plurality of requests based on when each of the requests were received by the request queue.

8. The system of claim 5, further comprising a transmission eligibility checker in communication with the request queue and configured to determine, after the request queue receives a respective request from a respective processor of the one or more processors, whether a respective data packet of the respective processor is eligible to be transmitted over the physical medium to the network based on a transmit eligibility state.

9. The system of claim 8, wherein the transmit eligibility state is persistent between consecutive data packets and updated after each transmission of data packets to the network.

10. The system of claim 8, wherein the transmission eligibility checker is further configured to:

compare a transmit eligibility field of the respective request to the transmit eligibility state; and determine not to transmit the respective data packet to the network when any bit set in the transmit eligibility field of the respective request is set in the transmit eligibility state; or determine to transmit the respective data packet to the network when no bits set in the transmit eligibility field of the respective request are set in the transmit eligibility state.

11. The system of claim 8, further comprising a state machine in communication with the transmission eligibility checker and the data buffer, the state machine being configured to provide a transmission status of the respective data packet to the respective processor based on the determination by the transmission eligibility checker, the transmission status specifying whether the respective data packet is eligible to be transmitted.

12. The system of claim 11, wherein the transmission status is indicative of whether the respective data packet has been transmitted.

13. The system of claim 1, further comprising:
a second processor of the one or more processors configured to create a second data packet for transmission over the physical medium to the network, the second data packet containing a second plurality of data segments in an ordered format assigned with the source address for the device, the destination addresses of the other device on the network, the established communication path between the source address and the destination address, and the routing protocol for routing the first data packet over the established communication path;
a first request queue configured to receive a first request from the first processor to transmit the first data packet from the data buffer to the network; and
a second request queue configured to receive a second request from the second processor to transmit the second data packet from the data buffer to the network.

14. The system of claim 13, wherein the first request comprises a series of commands, each respective command in the series of commands representing a respective portion of the first data packet.

15. The system of claim 14, wherein each respective portion of the first data packet is stored in the data buffer, such that the first data packet is assembled from the respective portions of the first data packet in the data buffer based on the series of commands of the first request.

16. The system of claim 2, wherein the data buffer is configured to limit a rate at which data is read from the data buffer, such that a time frame for modifying the first data packet by the first processor is maximized.

17. A computer implemented method comprising:
creating, by a first processor of one or more processors implemented in an application layer of an open systems interconnection (OSI) reference model, a first data packet for transmission over a physical medium from a device to a network, the first data packet containing a first plurality of data segments in an ordered format, each data segment of the first plurality of data segments being assigned with a source address of the device, a destination address of another device on the network, an established communication path between the source address and the destination address, and a routing protocol for routing the first data packet over the established communication path;
receiving, by a data buffer coupled to the first processor, the first data packet directly from the first processor;
storing, by the data buffer, the first data packet;
receiving, by a medium access component in communication with the data buffer, the first data packet directly from the data buffer;
encapsulating, by the medium access component, the first data packet into a frame suitable for transmission, the frame being a binary sequence of bits;
receiving, by a transceiver component in communication with the medium access component and the physical medium, the binary sequence of bits of the frame;
converting, by the transceiver component, the binary sequence of bits into signals; and
transferring, by an output port of the device in communication with the transceiver component, the signals to the physical medium, the output port being a physical interface between the network and the device.

18. The computer implemented method of claim 17, further comprising modifying, by the first processor, the first data packet while the first data packet is stored in the data buffer.

19. The computer implemented method of claim 17, wherein the data buffer is disposed closely adjacent to the medium access component to minimize latency of the receiving, by the medium access component, of the first data packet directly from the data buffer.

20. A system for transmitting data from a device to a network via a physical medium, the system comprising:
a means for creating, in an application layer of an open systems interconnection (OSI) reference model, a first data packet for transmission over the physical medium, the first data packet containing a plurality of data segments in an ordered format, each data segment of the plurality of data segments being assigned with a source address of the device, a destination address of another device on the network, an established communication path between the source address and the destination address, and a routing protocol for routing the first data packet over the established communication path;
a means for receiving and storing the first data packet directly from the means for creating the first data packet;
a means for encapsulating the first data packet into a frame suitable for transmission, the frame being a binary sequence of bits;
a means for receiving the binary sequence of bits of the frame;
a means for converting the binary sequence of bits into signals; and
a means for transmitting the signals to the physical medium.

* * * * *